(12) United States Patent
Takechi et al.

(10) Patent No.: US 10,139,487 B2
(45) Date of Patent: Nov. 27, 2018

(54) METEOROLOGICAL RADAR SYSTEM AND METHOD AND DEVICE FOR PROCESSING METEOROLOGICAL INFORMATION

(71) Applicant: Furuno Electric Co., Ltd., Nishinomiya (JP)

(72) Inventors: Yoshiaki Takechi, Nishinomiya (JP); Yasunobu Asada, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 363 days.

(21) Appl. No.: 14/912,068

(22) PCT Filed: Jun. 3, 2014

(86) PCT No.: PCT/JP2014/064686
§ 371 (c)(1),
(2) Date: Feb. 12, 2016

(87) PCT Pub. No.: WO2015/005020
PCT Pub. Date: Jan. 15, 2015

(65) Prior Publication Data
US 2016/0252614 A1    Sep. 1, 2016

(30) Foreign Application Priority Data

Jul. 11, 2013    (JP) .................................. 2013-145769

(51) Int. Cl.
*G01S 13/87*    (2006.01)
*G01S 13/95*    (2006.01)
(Continued)

(52) U.S. Cl.
CPC .............. *G01S 13/95* (2013.01); *G01S 7/024* (2013.01); *G01S 7/025* (2013.01); *G01S 13/58* (2013.01);
(Continued)

(58) Field of Classification Search
CPC .......... G01S 13/58; G01S 13/87; G01S 13/95; G01S 13/951; G01S 7/024; G01S 7/025; G01W 1/02; Y02A 90/18
(Continued)

(56) References Cited

U.S. PATENT DOCUMENTS 5,392,048 A * 2/1995 Michie .................. G01S 13/951
342/26 D
5,583,972 A    12/1996 Miller
(Continued)

FOREIGN PATENT DOCUMENTS

EP    2296010 A2    3/2011
JP    H07151866 A    6/1995
(Continued)

OTHER PUBLICATIONS

Shiraishi, E., "Local Rainfall Observation and Prediction Technology Trends", Science and Technology Trends, Feb. 2009, 15 pages. (Submitted with Partial English Translation of Cited Reference).
(Continued)

*Primary Examiner* — Timothy A Brainard
(74) *Attorney, Agent, or Firm* — Alleman Hall Creasman & Tuttle LLP

(57) ABSTRACT

A meteorological radar system and a method and device for processing meteorological information which can detect a rain cloud and detect an upward movement of the detected rain cloud in the sky, at low cost and short time are provided. A rain cloud detecting module detects a location and three-dimensional velocity of a rain cloud based on signals from at least three radars of first to third radars disposed at different locations. A rain cloud characteristic detecting module detects a characteristic of the detected rain cloud based on signals from either a radar being different from the three radars, or one of the three radars.

20 Claims, 12 Drawing Sheets

(51) Int. Cl.
  *G01S 13/58* (2006.01)
  *G01W 1/02* (2006.01)
  *G01S 7/02* (2006.01)

(52) U.S. Cl.
  CPC ............ *G01S 13/87* (2013.01); *G01S 13/951* (2013.01); *G01W 1/02* (2013.01); *Y02A 90/18* (2018.01)

(58) Field of Classification Search
  USPC ...................................................... 342/26 R
  See application file for complete search history.

(56) References Cited

U.S. PATENT DOCUMENTS

| | | | | |
|---|---|---|---|---|
| 5,974,360 | A | * | 10/1999 | Otsuka ................. G01S 13/951 342/26 D |
| 6,018,307 | A | * | 1/2000 | Wakayama ............ G01S 13/87 342/179 |
| 6,061,013 | A | | 5/2000 | Sauvageot et al. |
| 6,977,608 | B1 | * | 12/2005 | Anderson .............. G01C 21/16 340/945 |
| 8,601,864 | B1 | | 12/2013 | Eilts et al. |
| 2006/0202886 | A1 | * | 9/2006 | Mahapatra ................ G01S 7/12 342/176 |
| 2010/0315432 | A1 | | 12/2010 | Hannesen et al. |
| 2011/0063161 | A1 | * | 3/2011 | Ishizawa ................ G01S 7/023 342/159 |
| 2011/0102249 | A1 | * | 5/2011 | Venkatachalam ..... G01S 13/878 342/26 R |

FOREIGN PATENT DOCUMENTS

| | | |
|---|---|---|
| JP | H09329672 A | 12/1997 |
| JP | H1138154 A | 2/1999 |
| JP | H11281740 A | 10/1999 |
| JP | 2000131458 A | 5/2000 |
| JP | 2002098760 A | 4/2002 |
| JP | 2003344556 A | 12/2003 |
| JP | 2006208195 A | 8/2006 |
| JP | 2009098001 A | 5/2009 |
| JP | 2010256333 A | 11/2010 |
| JP | 2011033528 A | 2/2011 |
| WO | 2009140143 A1 | 11/2009 |

OTHER PUBLICATIONS

Suzuki, O., "Old and New Weather Radar Observation Equipment", In Proceedings of Forefront of Weather Observation Technology, Aug. 7, 2010, Tsukuba, Japan, 8 pages. (Submitted with Partial English Translation of Cited Reference).

State Intellectual Property Office of the People's Republic of China, Office Action Issued in Chinese Application No. 201480045973.5, dated May 4, 2017, 8 pages.

Japan Patent Office, Office Action Issued in Japanese Application No. 2015-526209, dated Jun. 23, 2017, 7 pages.

"Kaitei Radar Gijutsu," The Institute of Electronics, Information and Communication Engineers, Chapter 9, Oct. 1, 1996, 22 pages. (Submitted with Partial Translation).

ISA Japanese Patent Office, International Search Report Issued in Application No. PCT/JP2014/064686, dated Sep. 16, 2014, WIPO, 2 pages.

Eastment, J. et al., "A Vertically-Pointing Doppler Radar to Measure Precipitation Characteristics in the Tropics," IEEE Transactions on Geoscience and Remote Sensing, vol. 33, No. 6, Nov. 1995, 4 pages.

European Patent Office, Extended European Search Report Issued in Application No. 14823004.8, dated Feb. 9, 2017, Munich, Germany, 10 pages.

\* cited by examiner

METEOROLOGICAL RADAR SYSTEM AND METHOD AND DEVICE FOR PROCESSING METEOROLOGICAL INFORMATION

TECHNICAL FIELD

This disclosure relates to a meteorological radar system and a method and device for processing meteorological information, and particularly to a meteorological radar system and a method and device for processing meteorological information, which observe or predict meteorological weather based on signals from a radar.

BACKGROUND ART

Conventionally, a system for observing or predicting meteorological weather based on signals from a radar.

With a method of predicting thunder disclosed in Patent Document 1 (JP1997-329672A), a type of a precipitation particle is identified and a possibility of thunder occurrence is predicted, based on a radar reflectivity factor with respect to a horizontally polarized wave of a dual-polarization radar and a radar reflectivity factor difference between horizontally and vertically polarized waves.

Further, with a system disclosed in Patent Document 2 (JP1999-281740A), an approximate location of a meteorological phenomenon, such as a rain cloud, is detected by a search radar with a low resolution using a fan beam, and an accurate location of the meteorological phenomenon, such as the rain cloud, is detected by an observation radar with a high resolution using a pencil beam.

A meteorological radar apparatus in Patent Document 3 (JP2010-256333A) includes an active phased array antenna unit in which a plurality of antenna elements which transmit a radar pulse and receive a refection pulse are vertically arrayed, so as to obtain a rainfall intensity and a Doppler velocity in short time.

REFERENCE DOCUMENT(S) OF CONVENTIONAL ART

Patent Documents

Patent Document 1: JP1997-329672A
Patent Document 2: JP1999-281740A
Patent Document 3: JP2010-256333A

DESCRIPTION OF THE DISCLOSURE

Problems to be Solved by the Disclosure

However, with the dual-polarization radar disclosed in Patent Document 1, since the type of the precipitation particle is identified and the possibility of thunder occurrence is predicted across the sky, there is a disadvantage that signal processing takes long time (e.g., 5 to 10 minutes).

With the system disclosed in Patent Document 2, although a three-dimensional location of the rain cloud can be detected, there is a disadvantage that both an accurate location of the detected rain cloud and characteristics of the rain cloud cannot be detected.

The phased array type disclosed in Patent Document 3 has a disadvantage that it is large in size and expensive.

Therefore, the purpose of this disclosure is to provide a meteorological radar system and a method and device for processing meteorological information, which can detect a location of a rain cloud and, additionally, characteristics of the rain cloud at low cost and in short time.

Summary of the Disclosure

According to one aspect of this disclosure, a meteorological information processing device includes a rain cloud detecting module configured to detect a location and three-dimensional velocity of a rain cloud based on signals from at least three radars of first, second, third radars disposed at different locations, and a rain cloud characteristic detecting module configured to detect a characteristic of the rain cloud detected by the rain cloud detecting module (hereinafter "the detected rain cloud") based on signals from either a radar being different from the three radars, or one of the three radars.

The rain cloud detecting module may track the detected rain cloud by using the detected three-dimensional velocity of the rain cloud.

The rain cloud characteristic detecting module may detect the characteristic of the detected rain cloud based on the signals from the third radar. Each of the first and second radars may be a single-polarization radar. The third radar may be a dual-polarization radar.

The rain cloud characteristic detecting module may detect the characteristic of the detected rain cloud based on signals from a fourth radar different from the three radars. The fourth radar may be a dual-polarization radar.

The rain cloud detecting module may detect the location and three-dimensional velocity of the rain cloud based on signals obtained by controlling antennas of the three radars to perform a scan in a CAPPI mode.

The rain cloud characteristic detecting module may detect the characteristic of the rain cloud based on signals obtained by controlling an antenna of the radar to perform an RHI scan, the radar used to obtain the signals for detecting the characteristic of the rain cloud.

The rain cloud detecting module may detect the three-dimensional velocity of the rain cloud by detecting the location of the rain cloud, controlling the antennas of the first to third radars to perform a scan, and synthesizing velocity components obtained for the detected location of the rain cloud by the respective first to third radars, the location of the rain cloud detected based on signals obtained by controlling the antennas of the first and second radars to perform a scan.

The rain cloud detecting module may detect the three-dimensional velocity of the rain cloud by detecting the location of the rain cloud and a two-dimensional velocity of the rain cloud, predicting, based on the detected two-dimensional velocity of the rain cloud, a location of the rain cloud after the rain cloud moves, controlling the antennas of the first to third radars to perform a scan, and synthesizing velocity components obtained for the predicted location of the rain cloud by the respective first to third radars, the location of the rain cloud and the two-dimensional velocity of the rain cloud detected based on signals obtained by controlling the antennas of the first and second radars to perform a scan.

The rain cloud detecting module may detect the three-dimensional velocity of the rain cloud by detecting the location of the rain cloud based on the signal obtained by controlling the antenna of the first radar to perform a scan, controlling the antennas of the first to third radars to perform a scan, and synthesizing velocity components obtained for the detected location of the rain cloud by the respective first to third radars.

The meteorological information processing device may further include a radar controlling module configured to operate the third radar in a low power consumption state until the rain cloud is detected based on the signals from the first and second radars.

The meteorological information processing device may further include a radar controlling module configured to operate each of the second and third radars in a low power consumption state until the rain cloud is detected based on the signal from the first radar.

When a plurality of rain clouds are detected, the rain cloud detecting module may detect, based on the signals from one of the three radars, sizes of precipitation particles forming the detected rain clouds, respectively, and select, based on the detected sizes, a rain cloud with a highest possibility of causing precipitation as the rain cloud to be tracked.

The rain cloud characteristic detecting module may detect the characteristic of a precipitation particle forming the detected rain cloud.

The rain cloud characteristic detecting module may detect a vertical length of the detected rain cloud.

The meteorological information processing device may further include a precipitation predicting module configured to predict precipitation based on at least one of the detected location, three-dimensional velocity and characteristic of the rain cloud.

The characteristic of the rain cloud may include a size of a precipitation particle forming the rain cloud. The precipitation predicting module may predict occurrence of the precipitation based on the size of the precipitation particle forming the rain cloud.

The precipitation predicting module may predict occurrence of the precipitation based on a vertical length of the rain cloud.

According to one aspect of this disclosure, a meteorological radar system includes two single-polarization radars and a single dual-polarization radar that are disposed at different locations, and a meteorological information processing device. The meteorological information processing device includes a rain cloud detecting module configured to detect a location and three-dimensional velocity of a rain cloud based on signals from the two single-polarization radars and the single dual-polarization radar, and a rain cloud characteristic detecting module configured to detect a characteristic of the detected rain cloud based on signals from the dual-polarization radar.

In a transmission and reception of a radio wave, each of the three radars may form a pencil type antenna beam.

According to one aspect of this disclosure, a method of processing meteorological information includes detecting a location of a rain cloud based on a signal obtained by controlling at least one of antennas of three radars to perform a CAPPI scan, the three radars disposed at different locations, detecting a three-dimensional velocity of the detected rain cloud based on signals obtained by controlling the antennas of the three radars to perform a CAPPI scan, tracking the rain cloud by using the detected three-dimensional velocity of the rain cloud, and detecting a characteristic of the detected rain cloud based on signals obtained by controlling an antenna of either: a radar being different from the three radars, or one of the three radars, to perform an RHI scan.

Effect(s) of the Disclosure

According to this disclosure, an accurate location of a rain cloud can be detected and, additionally, characteristics of the rain cloud can be detected at low cost and in short time.

BRIEF DESCRIPTION OF DRAWING(S)

Figure 7A:
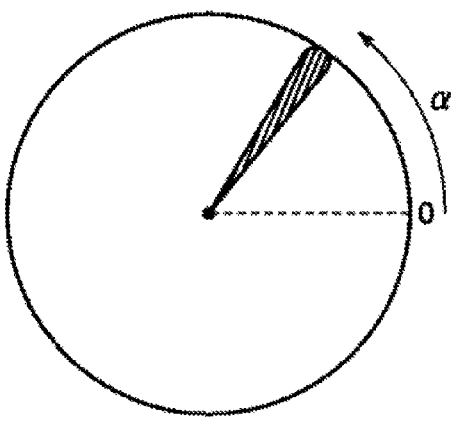
Figure 7B:
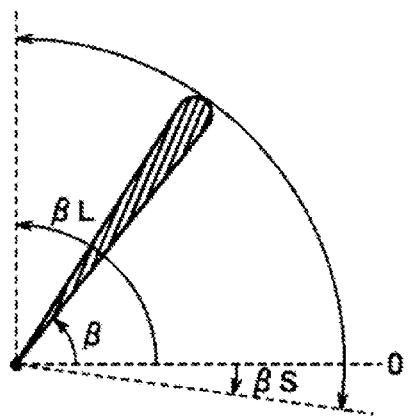

FIGS. 7(A) and 7(B) show views illustrating scan areas of antennas of the single-polarization Doppler radar and the dual-polarization Doppler radar.

Figure 8:
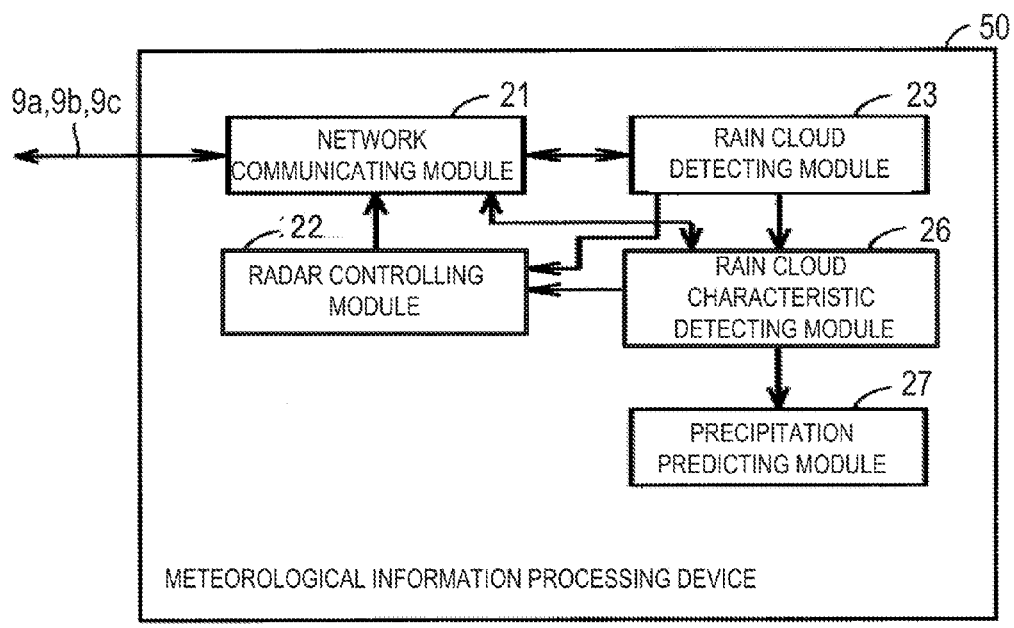

FIG. 8 is a view illustrating a configuration of a meteorological information processing device of the first embodiment.

Figure 9:
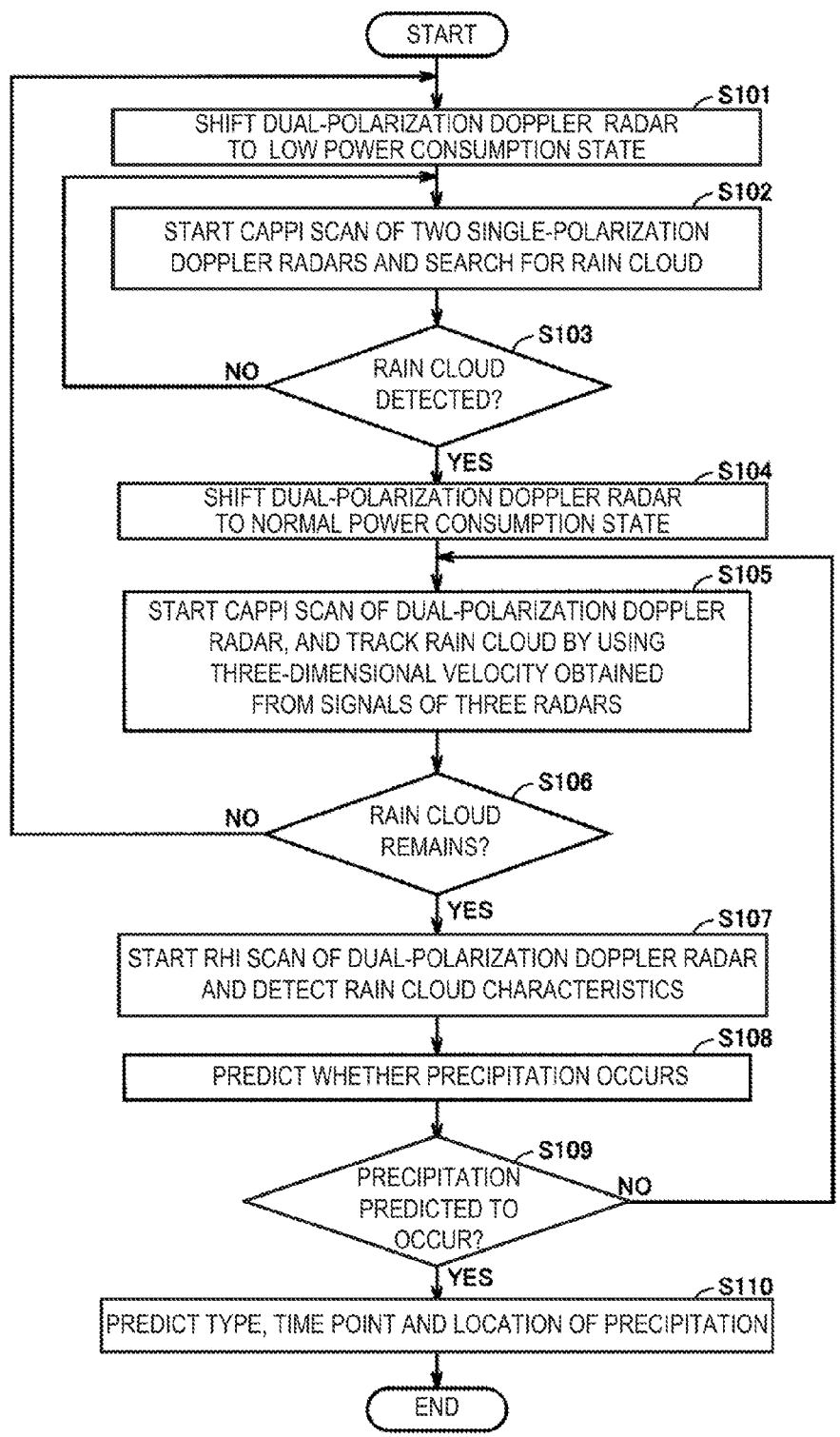

FIG. 9 is a view illustrating a procedure of a detection of a rain cloud and a characteristic detection of the rain cloud in the first embodiment.

Figure 10:
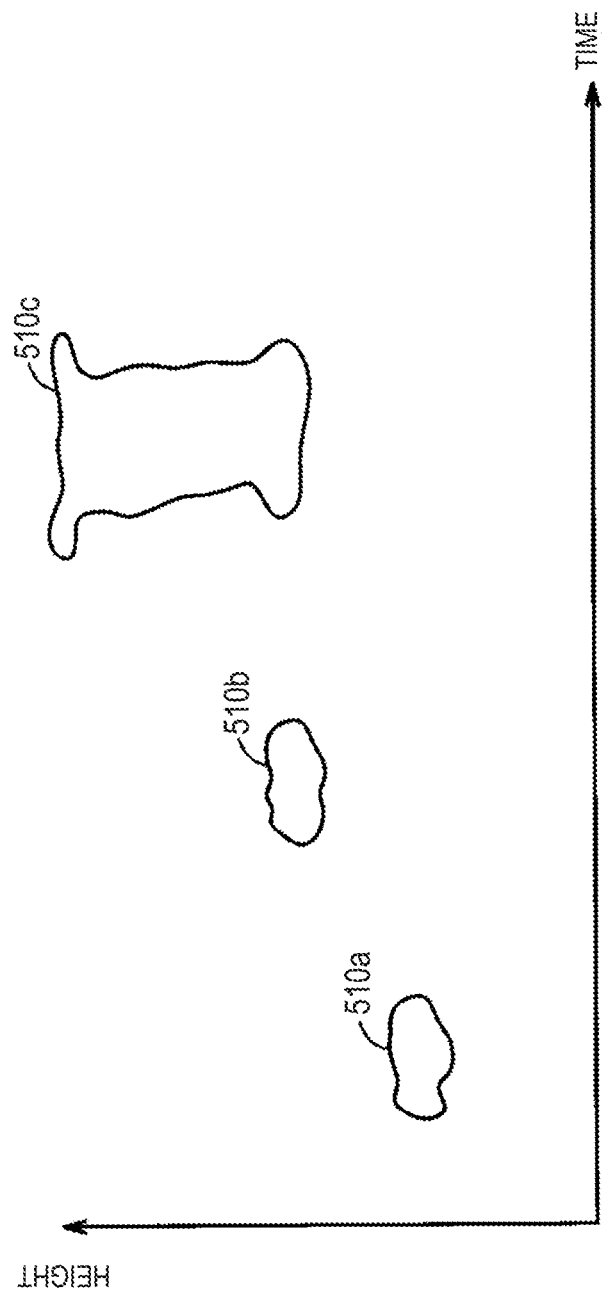

FIG. 10 is a view illustrating a generation and growth of the rain cloud.

Figure 11A:
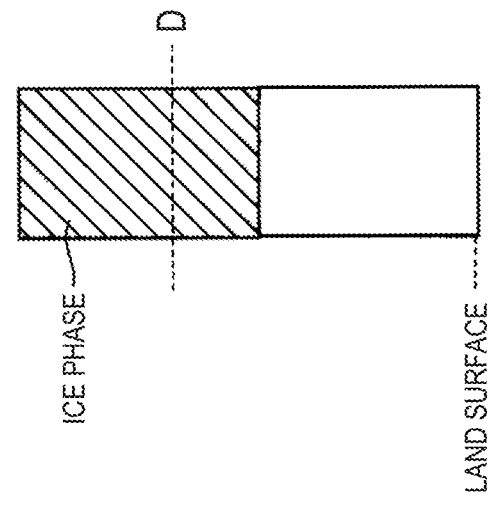

FIGS. 11(A) and (B) show views illustrating a distance of an ice phase from a land surface and a type of precipitation.

Figure 12:
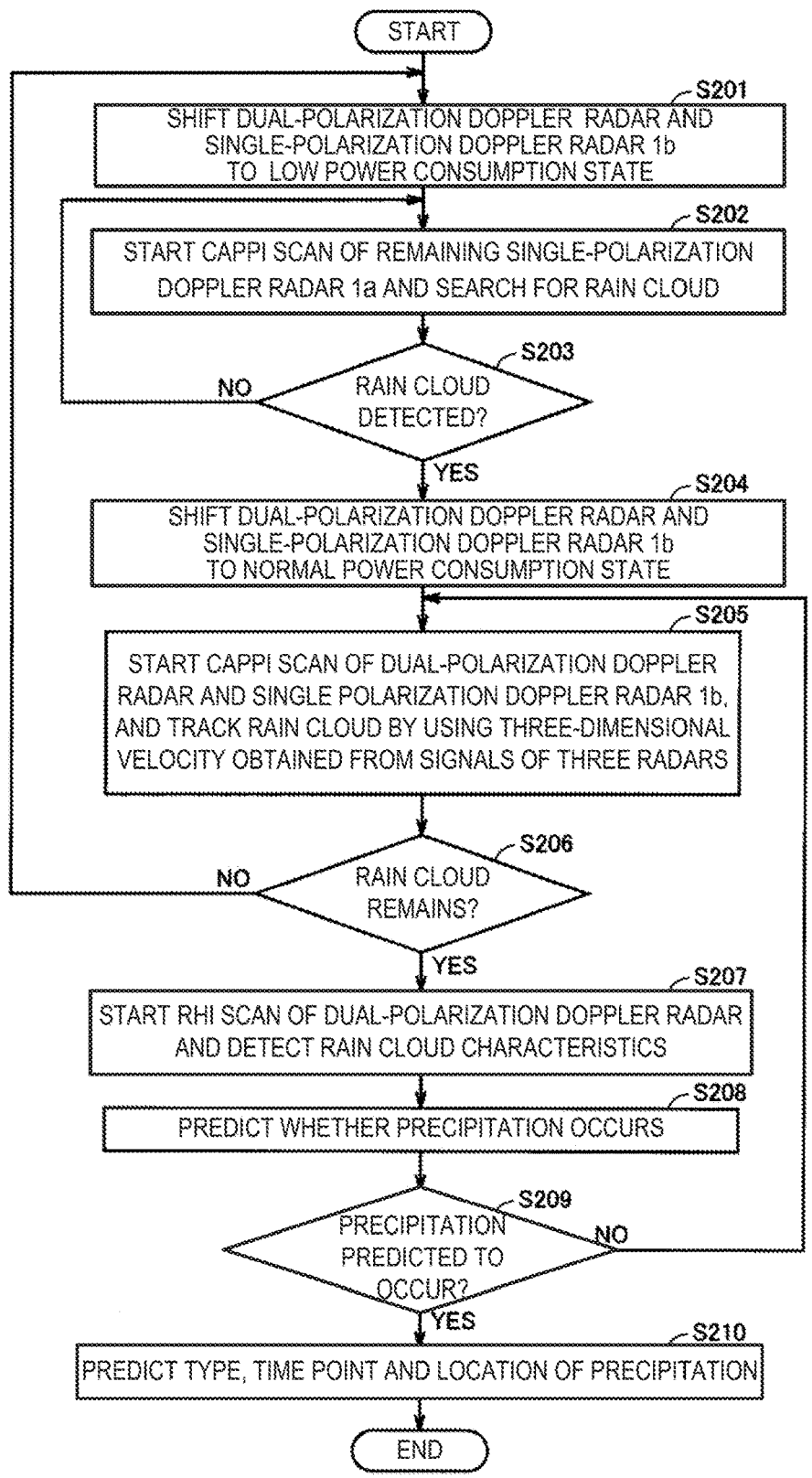

FIG. 12 is a view illustrating a procedure of a detection of a rain cloud and a characteristic detection of the rain cloud in a second embodiment.

Figure 13:
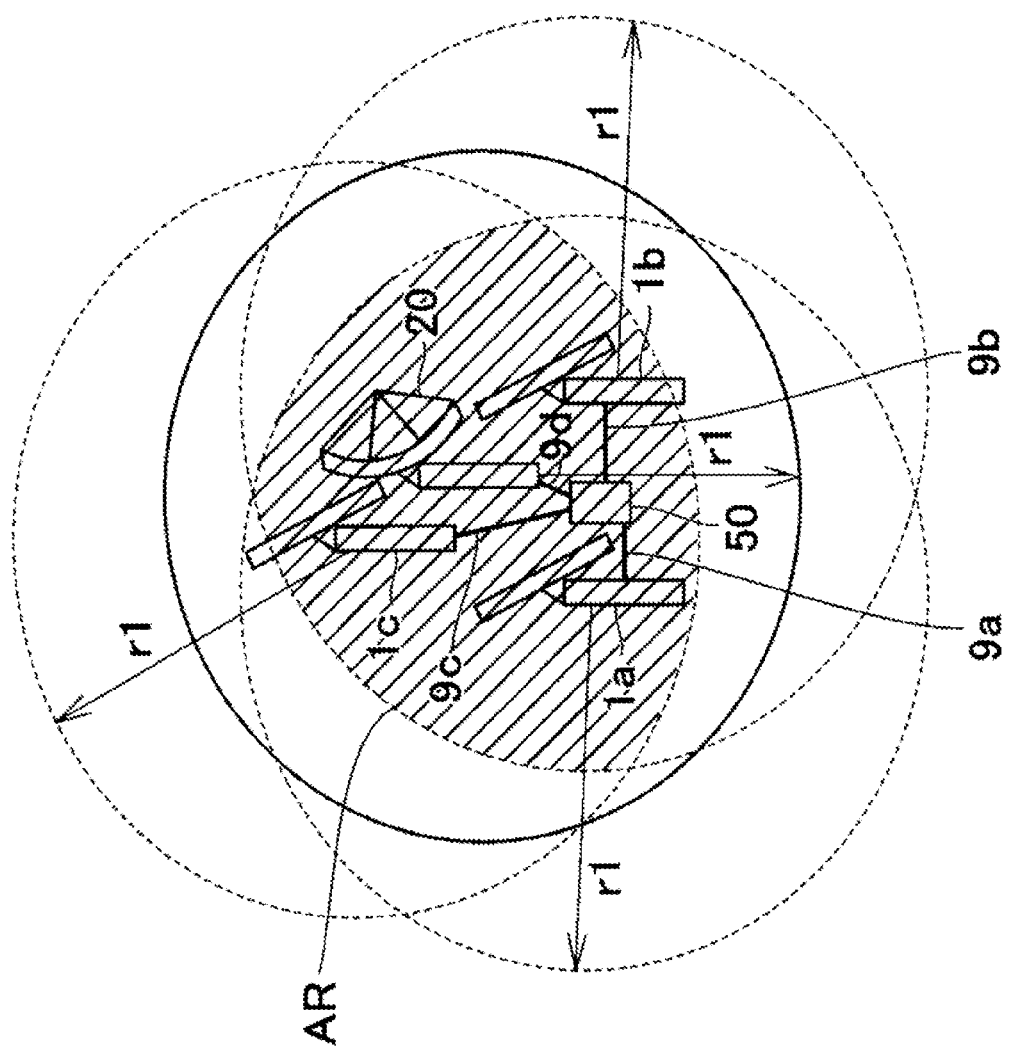

FIG. 13 is a view illustrating an arrangement of radars constituting a meteorological radar system of a third embodiment.

Figure 14:
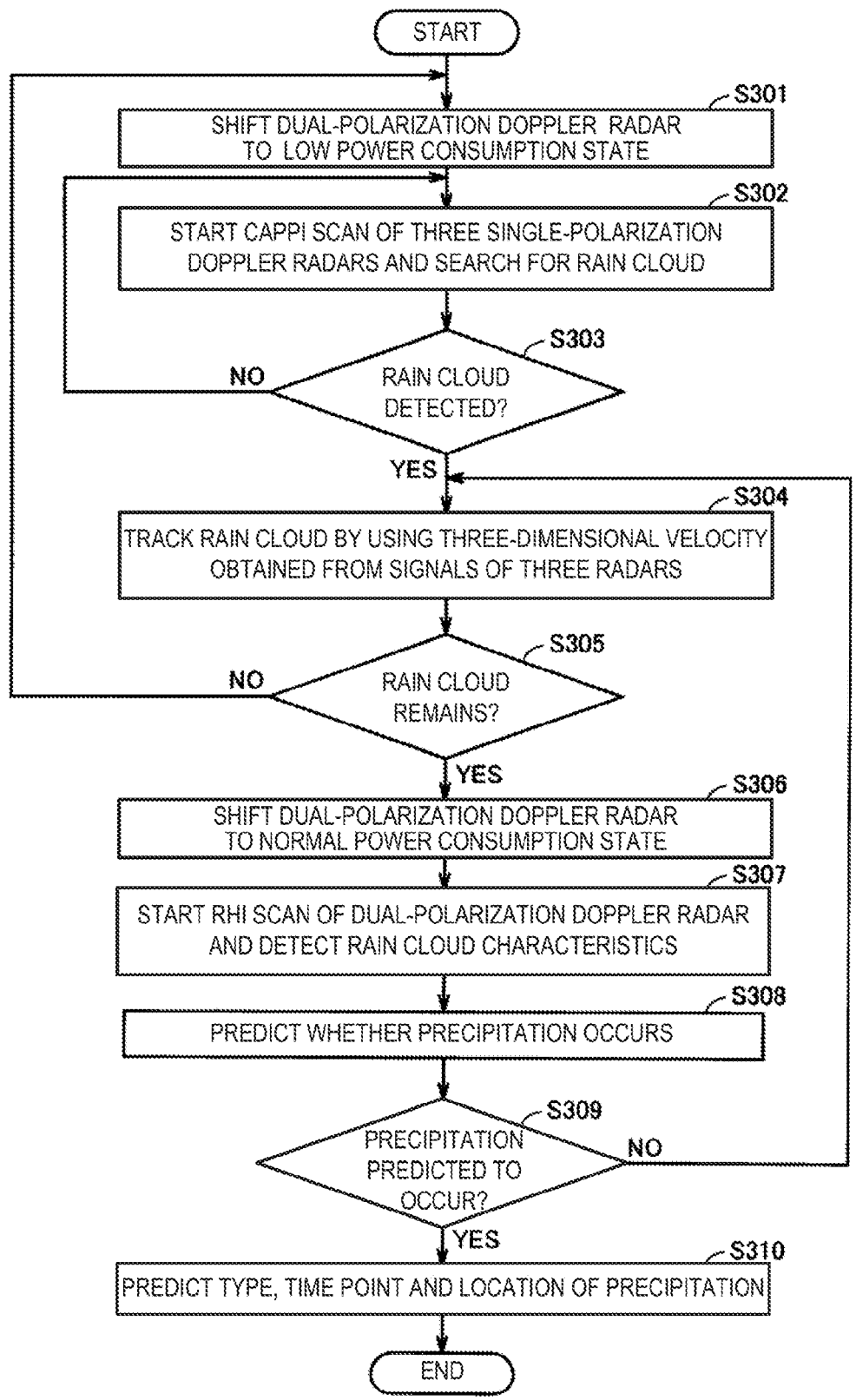

FIG. 14 is a view illustrating a procedure of a detection of a rain cloud and a characteristic detection of the rain cloud in the third embodiment.

MODE(S) FOR CARRYING OUT THE DISCLOSURE

Hereinafter, embodiments of this disclosure are described with reference to the drawings.

First Embodiment

Figure 1:
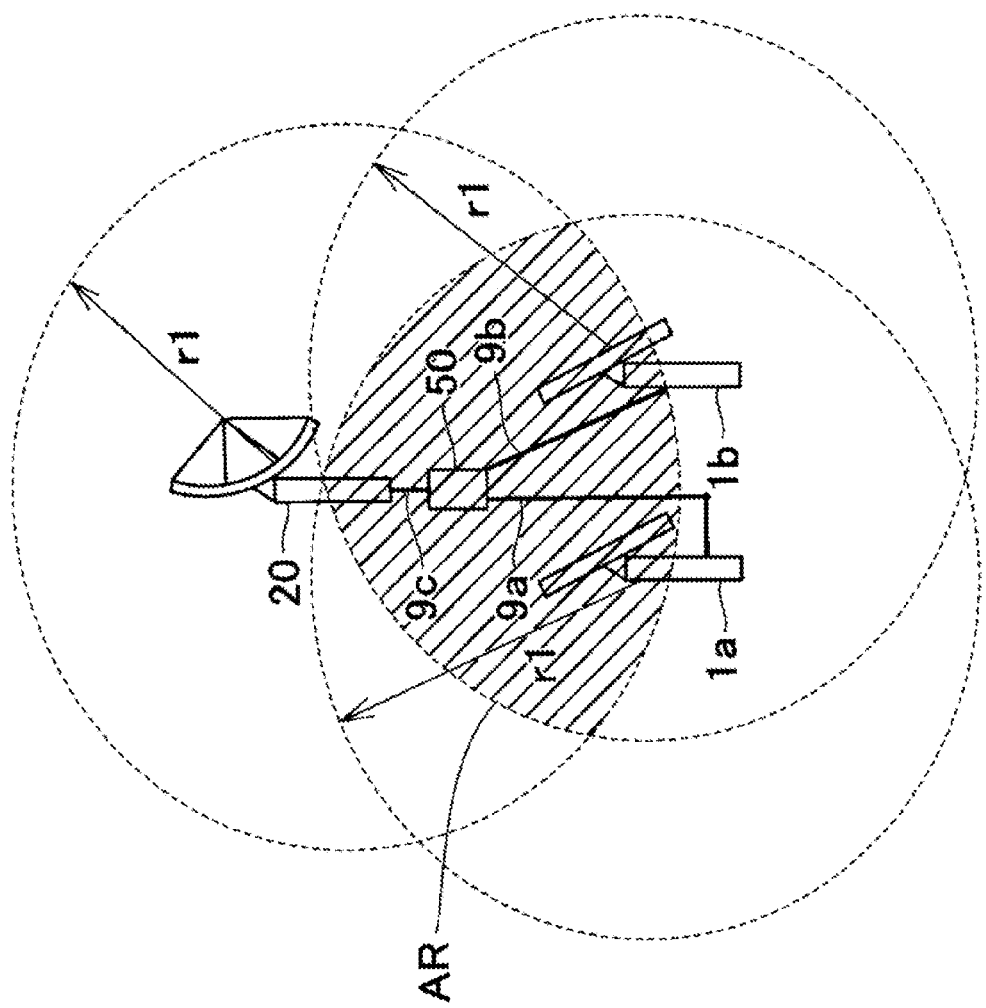
FIG. 1 is a view illustrating an arrangement of radars constituting a meteorological radar system according to a first embodiment.

FIG. 1 is a view illustrating an arrangement of radars constituting a meteorological radar system according to a first embodiment.

This meteorological radar system includes two single-polarization Doppler radars 1*a* and 1*b*, a single dual-polarization Doppler radar 20, and a meteorological information processing device 50.

The single-polarization Doppler radars 1*a* and 1*b* and the dual-polarization Doppler radar 20 are disposed at different locations discretely. These radars 1*a*, 1*b* and 20 are small in size, and may be installed in a small area, such as at a rooftop of a building. These radars 1*a*, 1*b* and 20 are not arranged in line. Further, an antenna of each of these radars 1*a*, 1*b* and 20 is a single element antenna.

A detectable distance of each of single-polarization Doppler radars 1a and 1b and the dual-polarization Doppler radar 20 is r1 in radius. An area AR where the detectable areas of the single-polarization Doppler radars 1a and 1b, and the detectable area of the dual polarization Doppler radar 20 overlap with each other is a detectable area for rain cloud.

The single-polarization Doppler radars 1a and 1b and the dual-polarization Doppler radar 20 are used to detect a location and velocity of a rain cloud. The dual-polarization Doppler radar 20 is used to detect characteristics of the detected rain cloud.

The single-polarization Doppler radars 1a and 1b and the dual-polarization Doppler radar 20 are connected with the meteorological information processing device 50 through wired/wireless networks 9a, 9b and 9c, respectively.

Figure 2:
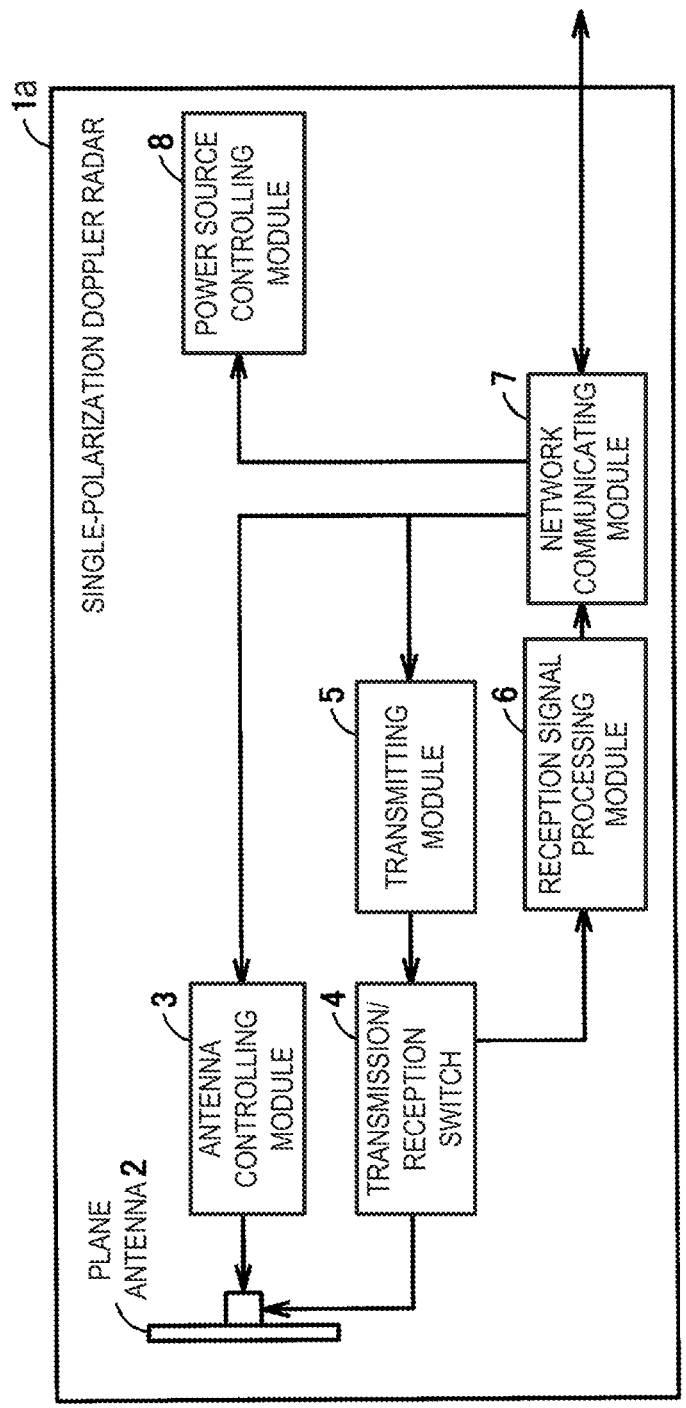
FIG. 2 is a view illustrating a configuration of a single-polarization Doppler radar.

FIG. 2 is a view illustrating a configuration of the single-polarization Doppler radar 1a. The single-polarization Doppler radar 1b has a similar configuration to the single-polarization Doppler radar 1a.

As illustrated in FIG. 2, the single-polarization Doppler radar 1a includes a plane antenna 2, an antenna controlling module 3, a transmission/reception switch 4, a transmitting module 5, a reception signal processing module 6, a network communicating module 7, and a power source controlling module 8.

When transmitting and receiving a radio wave, the plane antenna 2 forms a pencil-type antenna beam having sharp directivities in a bearing direction and an elevation angle direction of the plane antenna 2. The reason why such a pencil beam is used in this embodiment is, different from Patent Document 3, to detect an accurate location of the rain cloud by the single-polarization Doppler radar 1a. The plane antenna 2 transmits and receives a radio wave being a single-polarized wave.

Figure 3:
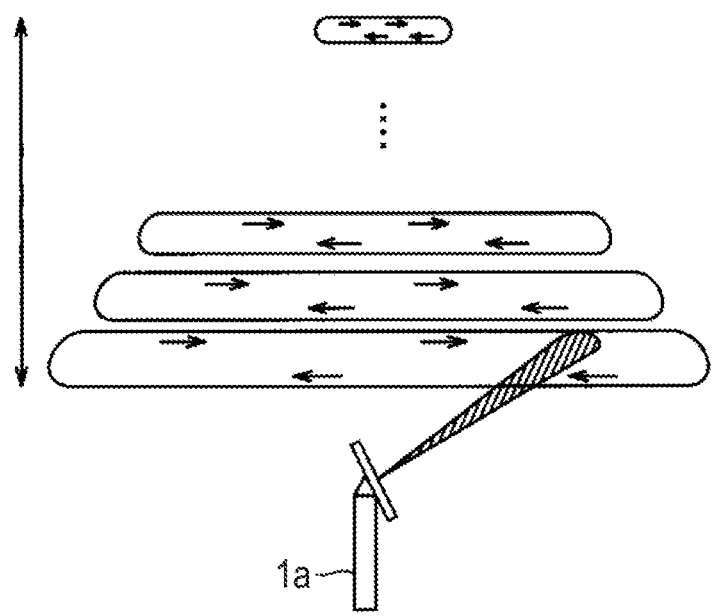
FIG. 3 is a view illustrating a CAPPI scan of a plane antenna.

The antenna controlling module 3 controls a CAPPI (Constant Altitude Plane Position Indicator) scan of the plane antenna 2. The CAPPI scan is a mode for horizontally rotating the plane antenna 2 at a plurality of elevation angles. FIG. 3 is a view illustrating the CAPPI scan of the plane antenna 2. As illustrated in FIG. 3, every time the plane antenna 2 fully rotates horizontally, the elevation angle thereof is changed to perform a similar rotational scan.

In the transmission, the transmission/reception switch 4 outputs a transmission signal from the transmitting module 5 to the plane antenna 2, and in the reception, the transmission/reception switch 4 outputs the signal from the plane antenna 2 to the reception signal processing module 6.

The transmitting module 5 generates the transmission signal by using a carrier wave in a frequency band of one of a microwave and a millimeter wave, and transmits it to the plane antenna 2.

The reception signal processing module 6 receives the reception signal from the plane antenna 2, generates a signal indicating a radar reflectivity factor and a signal indicating a velocity of the rain cloud in a radial direction from the plane antenna 2, and outputs the signals to the network communicating module 7.

The network communicating module 7 receives a signal regarding a power source control and a signal regarding an antenna control, from the meteorological information processing device 50. The network communicating module 7 transmits the signal indicating the radar reflectivity factor and the signal indicating the radial velocity, to the meteorological information processing device 50.

When the power source controlling module 8 receives from the meteorological information processing device 50 a command signal for shifting to a low power consumption state, the power source controlling module 8 shifts to the low power consumption state. When the power source controlling module 8 receives from the meteorological information processing device 50 a command signal for shifting to a normal power consumption state, the power source controlling module 8 shifts to the normal power consumption state. The low power consumption state is a state where a power consumption amount is small. In the low power consumption state, for example, a clock slower than a normal speed and power source voltage lower than a normal voltage are supplied to each of the components described above. Further for example, the clock and the power source voltage may not be supplied to component(s) which are not used for resuming the power to the normal power consumption state based on the command from the meteorological information processing device 50.

Figure 4:
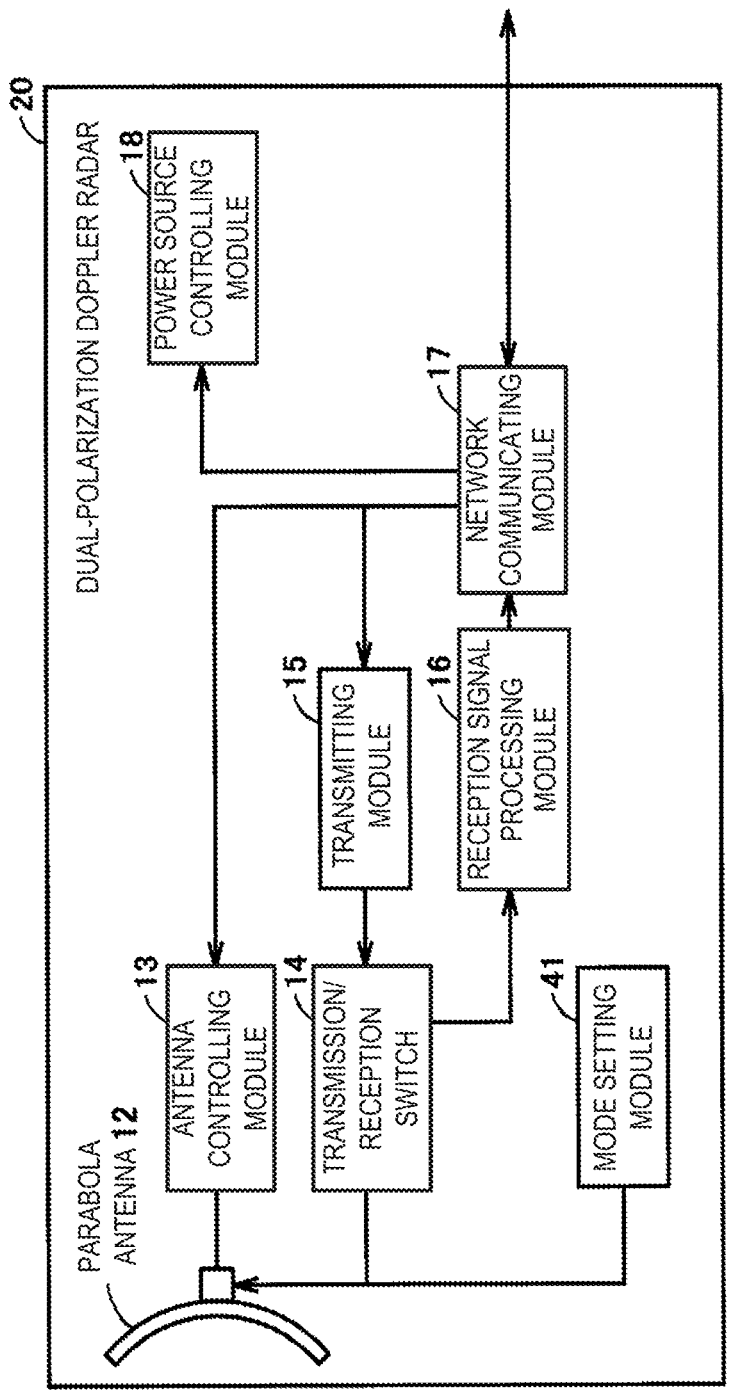
FIG. 4 is a view illustrating a configuration of a dual-polarization Doppler radar.

FIG. 4 is a view illustrating a configuration of the dual-polarization Doppler radar 20.

As illustrated in FIG. 4, the dual-polarization Doppler radar 20 includes a parabola antenna 12, an antenna controlling module 13, a transmission/reception switch 14, a transmitting module 15, a reception signal processing module 16, a network communicating module 17, and a power source controlling module 18.

The transmitting module 15 generates a transmission signal by using a carrier wave in a frequency band of one of a microwave and a millimeter wave.

In the transmission, the transmission/reception switch 14 outputs the signal from the transmitting module 15 to the parabola antenna 12, and in the reception, the transmission/reception switch 14 outputs a signal from the parabola antenna 12 to the reception signal processing module 16.

When transmitting and receiving a radio wave, the parabola antenna 12 forms a pencil-type antenna beam having sharp directivities in a bearing direction and an elevation angle direction of the parabola antenna 12. The parabola antenna 12 transmits and receives two kinds of radio waves that are a horizontally polarized wave (a radio wave of which electric field oscillates horizontally) and a vertically polarized wave (a radio wave of which electric field oscillates vertically) simultaneously.

In detecting the rain cloud, the antenna controlling module 13 controls a CAPPI scan of the parabola antenna 12, and in detecting characteristics of the rain cloud, the antenna controlling module 13 controls an RHI scan of the parabola antenna 12.

The reception signal processing module 16 generates signals indicating radar reflectivity factors of the horizontally and vertically polarized waves, and a velocity of the rain cloud in a radial direction from the parabola antenna 12, respectively, and outputs the signals to the network communicating module 17.

The network communicating module 17 receives, from the meteorological information processing device 50, a signal regarding an antenna control. The network communicating module 17 transmits the signals indicating the radar reflectivity factors of the horizontally and vertically polarized waves, respectively, and the radial velocity, to the meteorological information processing device 50.

When the power source controlling module 18 receives from the meteorological information processing device 50 a command signal for shifting to a low power consumption state, the power source controlling module 18 shifts to the low power consumption state. When the power source controlling module 18 receives from the meteorological information processing device 50 a command signal for shifting to a normal power consumption state, the power source controlling module 18 shifts to the normal power consumption state.

Figure 5:
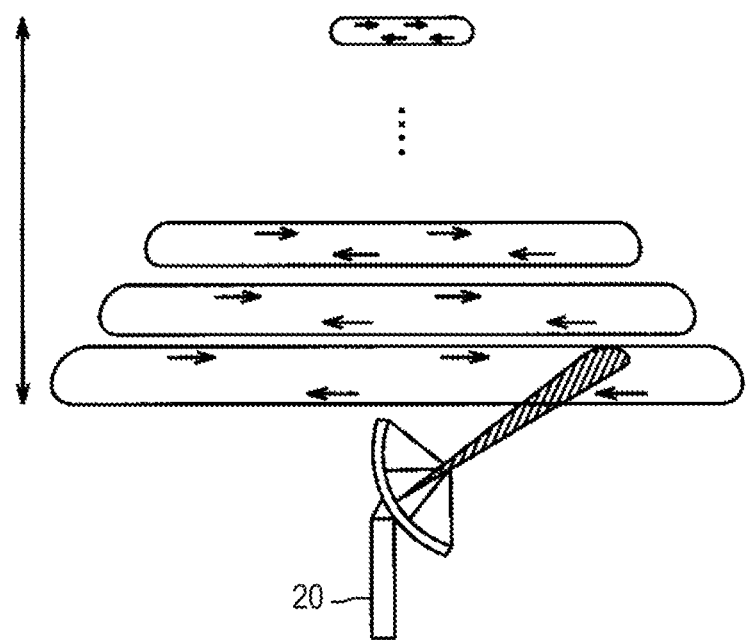
FIG. 5 is a view illustrating a CAPPI scan of a parabola antenna.

FIG. 5 is a view illustrating the CAPPI scan of the parabola antenna 12. Every time the parabola antenna 12 fully rotates horizontally, the elevation angle thereof is changed to perform a similar rotational scan.

Figure 6:
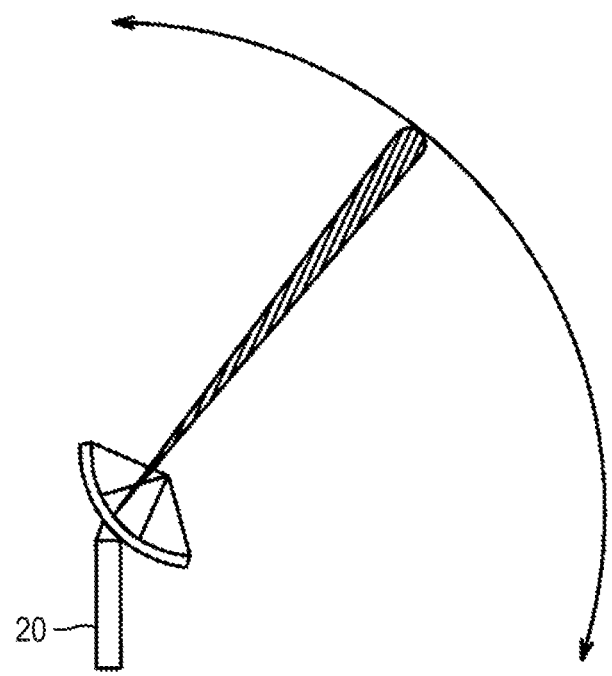
FIG. 6 is a view illustrating an RHI scan of the parabola antenna.

FIG. 6 is a view illustrating the RHI scan of the parabola antenna 12. The parabola antenna 12 performs a scan in a direction that the elevation angle changes.

FIGS. 7(A) and 7(B) are views illustrating scan areas of the antennas of the single-polarization Doppler radars 1a and 1b and the dual-polarization Doppler radar 20.

As illustrated in FIG. 7(A), in each of the CAPPI scans of the radars 1a, 1b and 20, a bearing angle α of the antenna changes. For example, a range of the bearing angle α is $0 \leq \alpha < 360$, the bearing angle α changes by Δα at a time and then changes back to the original angle.

Further as illustrated in FIG. 7, in each of the CAPPI scans of the radars 1a, 1b and 20 and the RHI scan of the radar 20, an elevation angle β of the antenna changes. For example, a range of the elevation angle β is $\beta S \leq \beta \leq \beta L$, and the elevation angle β changes by Δβ at a time.

FIG. 8 is a view illustrating a configuration of the meteorological information processing device of the first embodiment. Respective function blocks illustrated in FIG. 8 may be achieved by executing a meteorological information processing program stored in a CPU (Central Processing Unit) in advance, or by calculation processing performed using a dedicated electronic circuit (hardware).

As illustrated in FIG. 8, the meteorological information processing device 50 includes a network communicating module 21, a radar controlling module 22, a rain cloud detecting module 23, a rain cloud characteristic detecting module 26, and a precipitation predicting module 27.

The radar controlling module 22 generates signals for controlling the scans and power consumptions of the antennas of the single-polarization Doppler radars 1a and 1b and the dual-polarization Doppler radar 20, and transmits them to the network communicating module 21.

The network communicating module 21 transmits the signals for controlling the scans and power consumptions of the antennas, to the single-polarization Doppler radars 1a and 1b and the dual-polarization Doppler radar 20.

The network communicating module 21 receives the signals indicating the radar reflectivity factors and the radial velocities, from the single-polarization Doppler radars 1a and 1b. The network communicating module 21 receives the signals indicating the radar reflectivity factors of the horizontally and vertically polarized waves and the radial velocity, from the dual-polarization Doppler radar 20.

The rain cloud detecting module 23 detects the location of the rain cloud and a two-dimensional velocity of the rain cloud based on the signals obtained by controlling the antennas of the single-polarization Doppler radars 1a and 1b to perform the CAPPI scan. The rain cloud detecting module 23 detects a three-dimensional velocity of the rain cloud by controlling the antennas of the single-polarization Doppler radars 1a and 1b and the dual-polarization Doppler radar 20 to perform the CAPPI scan and synthesizing the radial velocities obtained from the respective radars. The rain cloud detecting module 23 tracks the detected rain cloud by using the three-dimensional velocity of the detected rain cloud.

The rain cloud characteristic detecting module 26 detects the characteristics of the rain cloud based on the signals from the dual-polarization Doppler radar 20. The characteristics of the rain cloud are, for example, characteristics of a precipitation particle forming the rain cloud (a type and size of the precipitation particle) and a vertical length of the rain cloud.

The precipitation predicting module 27 predicts precipitation based on at least one of the location, the three-dimensional velocity, and the characteristics of the detected rain cloud. The precipitation predicting module 27 predicts occurrence of the precipitation based on the size of the precipitation particle forming the rain cloud and the vertical length of the rain cloud. When the precipitation occurs, the precipitation predicting module 27 predicts the type of the precipitation based on the type of the precipitation particle forming the rain cloud and a distance of the precipitation particle from a land surface. Further, the precipitation predicting module 27 predicts a time and location of the precipitation based on the distance of the precipitation particle forming the rain cloud from the land surface and the three-dimensional velocity of the rain cloud.

FIG. 9 is a view illustrating a procedure of the detection of the rain cloud and the characteristic detection of the rain cloud in the first embodiment. FIG. 10 is a view illustrating a generation and growth of the rain cloud.

As illustrated in FIG. 10, the generated rain cloud 510a has a characteristic that it moves higher in the sky with time as indicated by 510b, and then grows vertically as indicated by 510c. The procedure illustrated in FIG. 9 focuses on such a growing process of the rain cloud.

With reference to FIG. 9, at S101, the radar controlling module 22 of the meteorological information processing device 50 transmits the command signal for shifting the dual-polarization Doppler radar 20 to the low power consumption state, to the dual-polarization Doppler radar 20 through the network communicating module 21 and the network 9c. The power source controlling module 18 of the dual-polarization Doppler radar 20 shifts to the low power consumption state, upon receiving through the network communicating module 17 the command signal for shifting to the low power consumption state.

At S102, the radar controlling module 22 of the meteorological information processing device 50 transmits the signals for controlling the plane antennas 2 of the two single-polarization Doppler radars 1a and 1b to perform the CAPPI scan, to the single-polarization Doppler radars 1a and 1b through the network communicating module 21 and the networks 9a and 9b, respectively.

The antenna controlling module 3 of the single-polarization Doppler radar 1a, upon receiving through the network communicating module 7 the signal for controlling the plane antenna 2 to perform the CAPPI scan, starts the CAPPI scan of the plane antenna 2. The reception signal processing module 6 of the single-polarization Doppler radar 1a transmits, to the meteorological information processing device 50 through the network communicating module 7 and the network 9a, signals indicating, while a time point i=1 to N and the plane antenna 2 is at a rotational angle αa(i) ($0 \leq \alpha a(i) < 360$) and an elevation angle βa($\beta S \leq \beta a(i) \leq \beta L$), a radar reflectivity factor Za (αa(i), βa(i), da(j)) and a radial velocity Va (αa(i), βa(i), βa(j)) respectively at a distance da(j) (j=1 to M, $0 < da(j) \leq r1$) from the plane antenna 2.

Similarly, the antenna controlling module 3 of the single-polarization Doppler radar 1b, upon receiving through the network communicating module 7 the signal for controlling the plane antenna 2 to perform the CAPPI scan, starts the CAPPI scan of the plane antenna 2. The reception signal processing module 6 of the single-polarization Doppler radar 1b transmits, to the meteorological information processing device 50 through the network communicating module 7 and the network 9b, signals indicating, while the time point i=1 to N and the plane antenna 2 is at a rotational angle $\alpha b(i)$ ($0 \leq \alpha b(i) < 360$) and an elevation angle $\beta b(i)$ ($\beta S \leq \beta b(i) \leq \beta L$), a radar reflectivity factor Zb ($\alpha b(i)$, $\beta b(i)$, db(j)) and a radial velocity Vb ($\alpha b(i)$, $\beta b(i)$, db(j)) respectively at a distance db(j) (j=1 to M, $0 < db(j) \leq r1$) from the plane antenna 2.

The rain cloud detecting module 23 of the meteorological information processing device 50 receives from the single-polarization Doppler radar 1a through the network communicating module 21 the signal indicating the radar reflectivity factor Za ($\alpha a(i)$, $\beta a(i)$, da(j)) and the signal indicating the radial velocity Va ($\alpha a(i)$, $\beta a(i)$, da(j)), and receives from the single-polarization Doppler radar 1b through the network communicating module 21 the signal indicating the radar reflectivity factor Zb ($\alpha b(i)$, $\beta b(i)$, db(j)) and the signal indicating the radial velocity Vb ($\alpha b(i)$, $\beta b(i)$, db(j)). Note that, i=1 to N and j=1 to M. The rain cloud detecting module 23 calculates a rainfall intensity Ra ($\alpha a(i)$, $\beta a(i)$, da(j)) based on the radar reflectivity factor Za ($\alpha a(i)$, $\beta a(i)$, da(j)), and calculates a rainfall intensity Rb ($\alpha b(i)$, $\beta b(i)$, db(j)) based on the radar reflectivity factor Zb ($\alpha b(i)$, $\beta b(i)$, db(j)).

At S103, within i=1 to N and j=1 to M, at i and j included in the overlapping area AR illustrated in FIG. 1, the rain cloud detecting module 23 checks whether the rain cloud exists at a location inside the overlapping area AR illustrated in FIG. 1 and defined by ($\alpha a(i)$, $\beta a(i)$, da(j)) centering on the single-polarization Doppler radar 1a, by determining whether the rainfall intensity Ra ($\alpha a(i)$, $\beta a(i)$, da(j)) is a given value TH or above.

Further, within i=1 to N and j=1 to M, at i and j included in the overlapping area AR illustrated in FIG. 1, the rain cloud detecting module 23 checks whether the rain cloud exists at a location inside the overlapping area AR illustrated in FIG. 1 and defined by ($\alpha b(i)$, $\beta b(i)$, db(j)) centering on the single-polarization Doppler radar 1b, by determining whether the rainfall intensity Rb ($\alpha b(i)$, $\beta b(i)$, db(j)) indicates the given value TH or above.

If the rain cloud is detected, in other words, if one of the rainfall intensities Ra ($\alpha a(i)$, $\beta a(i)$, da(j)) and Rb ($\alpha b(i)$, $\beta b(i)$, db(j)) indicating the given value TH or above is detected (YES at S103), the processing proceeds to S104.

If the rain cloud is not detected, in other words, if neither one of the rainfall intensities Ra ($\alpha a(i)$, $\beta a(i)$, da(j)) and Rb ($\alpha b(i)$, $\beta b(i)$, db(j)) indicating the given value TH or above is detected (NO at S103), the processing returns to S102.

When the rain cloud 510a is detected as illustrated in FIG. 10, at S104, the radar controlling module 22 of the meteorological information processing device 50 transmits the command signal for shifting the dual-polarization Doppler radar 20 to the normal power consumption state, to the dual-polarization Doppler radar 20 through the network communicating module 21 and the network 9c. Upon receiving the command signal for shifting the dual-polarization Doppler radar 20 to the normal power consumption state through the network communicating module 17, the power source controlling module 18 of the dual-polarization Doppler radar 20 shifts to the normal power consumption state.

At S105, the radar controlling module 22 of the meteorological information processing device 50 transmits the signal for controlling the parabola antenna 12 of the dual-polarization Doppler radar 20 to perform the CAPPI scan, to the dual-polarization Doppler radar 20 through the network communicating module 21 and the network 9c.

The antenna controlling module 13 of the dual-polarization Doppler radar 20, upon receiving through the network communicating module 17 the signal for controlling the parabola antenna 12 to perform the CAPPI scan, starts the CAPPI scan of the parabola antenna 12. The reception signal processing module 16 of the dual-polarization Doppler radar 20 transmits, to the meteorological information processing device 50 through the network communicating module 17 and the network 9c, signals indicating, while the time point i=1 to N and the parabola antenna 12 is at a rotational angle $\alpha c(i)$ ($0 \leq \alpha c(i) < 360$) and an elevation angle $\beta c(i)$ ($\beta S \leq \beta c(i) \leq \beta L$), a radar reflectivity factor Zch ($\alpha c(i)$, $\beta c(i)$, dc(j)) of the horizontally polarized wave, a vertical radar reflectivity factor Zcv ($\alpha c(i)$, $\beta c(i)$, dc(j)), and a radial velocity Vc ($\alpha c(i)$, $\beta c(i)$, dc(j)) respectively at a distance dc(j) (j=1 to M, $0 < dc(j) \leq r1$) from the parabola antenna 12.

The rain cloud detecting module 23 of the meteorological information processing device 50 receives the signals indicating the radar reflectivity factor Zch ($\alpha c(i)$, $\beta c(i)$, dc(j)) of the horizontally polarized wave, the vertical radar reflectivity factor Zcv ($\alpha c(i)$, $\beta c(i)$, dc(j)), and the radial velocity Vc ($\alpha c(i)$, $\beta c(i)$, dc(j)), from the dual-polarization Doppler radar 20 through the network communicating module 21. Note that, i=1 to N and j=1 to M. The rain cloud detecting module 23 calculates a rainfall intensity Rc ($\alpha c(i)$, $\beta c(i)$, dc(j)) based on the horizontal radar reflectivity factor Zch ($\alpha c(i)$, $\beta c(i)$, dc(j)).

Further, since the single-polarization Doppler radars 1a and 1b also continue the CAPPI scan, the rain cloud detecting module 23 receives from the single-polarization Doppler radar 1a through the network communicating module 21 the signal indicating the radar reflectivity factor Za ($\alpha a(i)$, $\beta a(i)$, da(j)) and the signal indicating the radial velocity Va ($\alpha a(i)$, $\beta a(i)$, da(j)), and receives from the single-polarization Doppler radar 1b through the network communicating module 21 the signal indicating the radar reflectivity factor Zb ($\alpha b(i)$, $\beta b(i)$, db(j)) and the signal indicating the radial velocity Vb ($\alpha b(i)$, $\beta b(i)$, db(j)). Note that, i=1 to N and j=1 to M.

The rain cloud detecting module 23 predicts a current location of the rain cloud by using the two-dimensional velocity of the rain cloud obtained based on the radial velocities Va and Vb at the location where one of the rainfall intensities Ra and Rb is detected to be the given value or above at S103. Moreover, the rain cloud detecting module 23 predicts a future three-dimensional location of the rain cloud by using the three-dimensional velocity of the rain cloud obtained based on the radial velocities Va, Vb and Vc at the predicted current location. Next, the rain cloud detecting module 23, upon receiving the signal from one of the single-polarization Doppler radars 1a and 1b and the dual-polarization Doppler radar 20, determines whether the location where the one of the rainfall intensities Ra, Rb and Rc of the corresponding radar indicates the given value or above exists near the predicted location for after the rain cloud moves. By using the three-dimensional velocity, in addition to a horizontal movement of the rain cloud, a vertical movement can also be tracked as indicated by 510b of FIG. 10.

The rain cloud detecting module 23 repeats, for a given period of time, the tracking processing of the rain cloud as described above, in other words, the processing in which the three-dimensional velocity of the rain cloud is detected by controlling the three radars 1a, 1b and 20 to perform the CAPPI scan, the location of the rain cloud is predicted by using the three-dimensional velocity of the rain cloud, and whether the location where one of the rainfall intensities Ra, Rb and Rc indicates the given value or above exists near the predicted location is searched for.

If the state where the location where one of the rainfall intensities Ra, Rb and Rc indicates the given value or above exists, in other words, the state where the rain cloud remains, continues for the given time period (YES at S106), the processing proceeds to S107, and if the state where the rain cloud remains does not continue for the given time period (NO at S106), the processing returns to S101.

At S107, the radar controlling module 22 of the meteorological information processing device 50 transmits the signal for controlling the antenna of the dual-polarization Doppler radar 20 to perform the RHI scan at a bearing angle $\alpha c1$, to the dual-polarization Doppler radar 20 through the network communicating module 21 and the network 9c. The bearing angle $\alpha c1$ is calculated based on the location of the rain cloud for after it moves, predicted by using the three-dimensional velocity obtained at S105.

The antenna controlling module 13 of the dual-polarization Doppler radar 20, upon receiving through the network communicating module 17 the signal for controlling the antenna to perform the RHI scan at the fixed bearing angle $\alpha c1$, controls the parabola antenna 12 to perform the RHI scan. The reception signal processing module 16 of the dual-polarization Doppler radar 20 transmits to the meteorological information processing device 50 through the network communicating module 17 and the network 9c, signals indicating, while the time point i=1 to N and the parabola antenna 12 is at the fixed bearing angle $\alpha c1$ and the elevation angle $\beta c(i)$ ($\beta S \leq \beta c(i) \leq \beta L$), the radar reflectivity factor Zch ($\alpha c1$, $\beta c(i)$, dc(j)) of the horizontally polarized wave and the radar reflectivity factor Zcv ($\alpha c1$, $\beta c(i)$, dc(j)) of the vertically polarized wave respectively at the distance dc(j) (j=1 to M, 0<dc(j)≤r1) from the parabola antenna 12.

The rain cloud characteristic detecting module 26 of the meteorological information processing device 50 receives the signals indicating the radar reflectivity factor Zch ($\alpha c1$, $\beta c(i)$, dc(j)) of the horizontally polarized wave and the radar reflectivity factor Zcv ($\alpha c1$, $\beta c(i)$, dc(j)) of the vertically polarized wave, from the dual-polarization Doppler radar 20 through the network communicating module 21. Note that, i=1 to N and j=1 to M.

The rain cloud characteristic detecting module 26 determines the characteristics of the precipitation particle forming the rain cloud and the vertical length of the rain cloud at the location ($\alpha c1$, $\beta c(i)$, dc(j)) based on the radar reflectivity factor Zch ($\alpha c1$, $\beta c(i)$, dc(j)) of the horizontally polarized wave and the radar reflectivity factor Zcv ($\alpha c1$, $\beta c(i)$, dc(j)) of the vertically polarized wave.

For example, the rain cloud characteristic detecting module 26 determines the characteristics of the precipitation particle at the location ($\alpha c1$, $\beta c(i)$, dc(j)) based on the radar reflectivity factor Zch of the horizontally polarized wave, one of a difference and a ratio between the radar reflectivity factor Zch of the horizontally polarized wave and the radar reflectivity factor Zcv of the vertically polarized wave, a correlation coefficient between the radar reflectivity factor Zch of the horizontally polarized wave and the radar reflectivity factor Zcv of the vertically polarized wave, and a propagation phase difference change ratio that is a change ratio of a difference between a phase change of the radar reflectivity factor Zch of the horizontally polarized wave and a phase change of the radar reflectivity factor Zcv of the vertically polarized wave with respect to distance. The rain cloud characteristic detecting module 26 determines, for example, the size and type of the precipitation particle as the characteristics of the precipitation particle. The rain cloud characteristic detecting module 26 determines whether the type of the precipitation particle is one of four types of rain, graupel, ice pellet, and snowflake. Further, when the type of the precipitation particle at the location ($\alpha c1$, $\beta c(i)$, dc(j)) is one of graupel, ice pellet, and snowflake, the rain cloud characteristic detecting module 26 determines that the location is in an ice phase. Moreover, the rain cloud characteristic detecting module 26 calculates a rainfall intensity Rc ($\alpha c1$, $\beta c(i)$, dc(j)) based on the radar reflectivity factor Zch ($\alpha c1$, $\beta c(i)$, dc(j)) of the horizontally polarized wave. The rain cloud characteristic detecting module 26 determines an area where the rainfall intensity Rc ($\alpha c1$, $\beta c(i)$, dc(j)) continuously indicates the given value or above in the vertical direction, to be an existing range of the rain cloud in the vertical direction, and determines a length of the existing range in the vertical direction to be the length of the rain cloud in the vertical direction.

At S109, the precipitation predicting module 27 predicts that the precipitation occurs when the size of the precipitation particle at the location ($\alpha c1$, $\beta c(i)$, dc(j)) (i=1 to N, j=1 to M) indicates a given value or above or when the length of the rain cloud in the vertical direction indicates a given value or above, and the precipitation predicting module 27 predicts that the precipitation does not occur when the size and the length indicate below the given values, respectively. As indicated by 510c of FIG. 10, when the rain cloud grows, the length of the rain cloud in the vertical direction becomes the given value or above.

If the precipitation is predicted to occur (YES at S109), the processing proceeds to S110, and if the precipitation is predicted not to occur (NO at S109), the processing returns to S105.

Figure 11B:
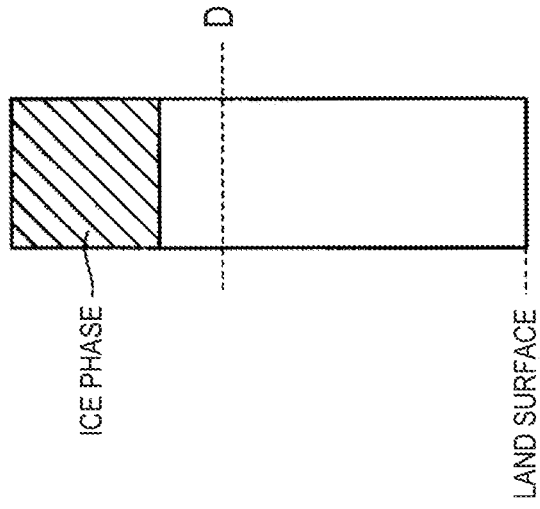

At S110, the precipitation predicting module 27 predicts the type of the precipitation. In other words, as illustrated in FIG. 11(A), when a distance of the ice phase from the land surface indicates a given value D or above, the precipitation predicting module 27 predicts that graupel, ice pellet, and snowflake changes to rain while falling, and rainfall occurs. As illustrated in FIG. 11(B), when the distance of the ice phase from the land surface indicates below the given value D, the precipitation predicting module 27 predicts that graupel, ice pellet, and snowflake fall as they are.

Further, the precipitation predicting module 27 predicts a precipitation time based on the distance of the ice phase from the land surface and a falling speed of the precipitation particle.

Moreover, the precipitation predicting module 27 predicts a precipitation location based on the distance of the ice phase from the land surface, the falling speed of the precipitation particle, and the three-dimensional velocity of the rain cloud.

As described above, according to this embodiment, the two single-polarization Doppler radars are controlled to perform the scan to detect the location of the rain cloud, the two single-polarization Doppler radars and the dual-polarization Doppler radar are controlled to perform the scan to detect the three-dimensional velocity of the detected rain cloud and track the rain cloud. Further, the dual-polarization Doppler radar is controlled to perform the scan to detect the characteristics of the rain cloud. Therefore, the accurate location of the rain cloud can be detected and the characteristics of the rain cloud can be detected at low cost and in short time.

Modification of First Embodiment

At S105, the rain cloud detecting module 23 predicts the current location of the rain cloud by using the two-dimensional velocity of the rain cloud obtained based on the radial velocities Va and Vb at the location where one of the rainfall intensities Ra and Rb is detected to be the given value or above at S103; however, when the scanning speeds of the radars 1a and 1b are high with respect to the speed of the rain cloud, even without using the two-dimensional velocity of the rain cloud obtained based on the radial velocities Va and Vb, the current location of the rain cloud can be detected.

In other words, the rain cloud detecting module 23 may predict a future three-dimensional location of the rain cloud by using the three-dimensional velocity of the rain cloud obtained based on the radial velocities Va, Vb and Vc at the location where one of the rainfall intensities Ra and Rb is detected to be the given value or above at S103.

Second Embodiment

FIG. 12 is a view illustrating a procedure of a detection of rain cloud and a characteristic detection of the rain cloud in a second embodiment.

At S201, the radar controlling module 22 of the meteorological information processing device 50 transmits the command signal for shifting the dual-polarization Doppler radar 20 to the low power consumption state to the dual-polarization Doppler radar 20 through the network communicating module 21 and the network 9c, and the command signal for shifting the single-polarization Doppler radar 1b to the low power consumption state to the single-polarization Doppler radar 1b through the network communicating module 21 and the network 9b. The power source controlling module 18 of the dual-polarization Doppler radar 20 shifts to the low power consumption state upon receiving through the network communicating module 17 the command signal for shifting to the low power consumption state. The power source controlling module 8 of the single-polarization Doppler radar 1b shifts to the low power consumption state upon receiving through the network communicating module 7 the command signal for shifting to the low power consumption state.

At S202, the radar controlling module 22 of the meteorological information processing device 50 transmits the signal for controlling the plane antenna 2 of the single single-polarization Doppler radar 1a to perform the CAPPI scan, to the single-polarization Doppler radar 1a through the network communicating module 21 and the network 9a.

The antenna controlling module 3 of the single-polarization Doppler radar 1a, upon receiving through the network communicating module 7 the signal for controlling the plane antenna 2 to perform the CAPPI scan, starts the CAPPI scan of the plane antenna 2. The reception signal processing module 6 of the single-polarization Doppler radar 1a transmits, to the meteorological information processing device 50 through the network communicating module 7 and the network 9a, the signals indicating, while a time point i=1 to N, the plane antenna 2 is at the rotational angle $\alpha a(i)$ ($0 \leq \alpha a(i) < 360$) and the elevation angle $\beta a(\beta S \leq \beta a(i) \leq \beta L)$, the radar reflectivity factor Za ($\alpha a(i)$, $\beta a(i)$, da(j)) and the radial velocity Va ($\alpha a(i)$, $\beta a(i)$, da(j)) respectively at the distance da(j) (j=1 to M, $0 < da(j) \leq r1$) from the plane antenna 2.

The rain cloud detecting module 23 of the meteorological information processing device 50 receives from the single-polarization Doppler radar 1a through the network communicating module 21 the signal indicating the radar reflectivity factor Za ($\alpha a(i)$, $\beta a(i)$, da(j)) and the signal indicating the radial velocity Va ($\alpha a(i)$, $\beta a(i)$, da(j)). Note that, i=1 to N and j=1 to M. The rain cloud detecting module 23 calculates the rainfall intensity Ra ($\alpha a(i)$, $\beta a(i)$, da(j)) based on the radar reflectivity factor Za ($\alpha a(i)$, $\beta a(i)$, da(j)).

At S203, within i=1 to N and j=1 to M, at i and j included in the overlapping area AR illustrated in FIG. 1, the rain cloud detecting module 23 checks whether the rain cloud exists at the location inside the overlapping area AR illustrated in FIG. 1 and defined by ($\alpha a(i)$, $\beta a(i)$, da(j)) centering on the single-polarization Doppler radar 1a, by determining whether the rainfall intensity Ra ($\alpha a(i)$, $\beta a(i)$, da(j)) indicates the given value TH or above.

If the rain cloud is detected, in other words, if the rainfall intensity Ra ($\alpha a(i)$, $\beta a(i)$, da(j)) indicating the given value TH or above is detected (YES at S203), the processing proceeds to S204.

If the rain cloud is not detected, in other words, if the rainfall intensity Ra ($\alpha a(i)$, $\beta a(i)$, da(j)) indicating the given value TH or above is not detected (NO at S203), the processing returns to S202.

As illustrated in FIG. 10, when the rain cloud 510a is detected, at S204, the radar controlling module 22 of the meteorological information processing device 50 transmits the command signal for shifting the dual-polarization Doppler radar 20 to the normal power consumption state, to the dual-polarization Doppler radar 20 through the network communicating module 21 and the network 9c. Upon receiving through the network communicating module 17 the command signal for shifting to the normal power consumption state, the power source controlling module 18 of the dual-polarization Doppler radar 20 shifts to the normal power consumption state. Further, the radar controlling module 22 of the meteorological information processing device 50 transmits the command signal for shifting the single-polarization Doppler radar 1b to the normal power consumption state, to the single-polarization Doppler radar 1b through the network communicating module 21 and the network 9b. Upon receiving through the network communicating module 7 the command signal for shifting to the normal power consumption state, the power source controlling module 8 of the single-polarization Doppler radar 1b shifts to the normal power consumption state.

At S205, the radar controlling module 22 of the meteorological information processing device 50 transmits the signal for controlling the parabola antenna 12 of the dual-polarization Doppler radar 20 to perform the CAPPI scan, to the dual-polarization Doppler radar 20 through the network communicating module 21 and the network 9c.

Further, the radar controlling module 22 of the meteorological information processing device 50 transmits the signal for controlling the plane antenna 2 of the single single-polarization Doppler radar 1b to perform the CAPPI scan, to the single-polarization Doppler radar 1b through the network communicating module 21 and the network 9b.

The antenna controlling module 3 of the single-polarization Doppler radar 1b, upon receiving through the network communicating module 7 the signal for controlling the plane antenna 2 to perform the CAPPI scan, starts the CAPPI scan of the plane antenna 2. The reception signal processing module 6 of the single-polarization Doppler radar 1b transmits, to the meteorological information processing device 50 through the network communicating module 7 and the network 9b, the signals indicating, while the time point i=1 to N and the plane antenna 2 is at the rotational angle $\alpha b(i)$ ($0 \leq \alpha b(i) < 360$) and the elevation angle $\beta b(i)$ ($\beta S \leq \beta b(i) \leq \beta L$), the radar reflectivity factor Zb ($\alpha b(i)$, $\beta b(i)$, db(j)) and the radial velocity Vb ($\alpha b(i)$, $\beta b(i)$, db(j)) respectively at the distance db(j) (j=1 to M, $0 < db(j) \leq r1$) from the plane antenna 2.

The antenna controlling module 13 of the dual-polarization Doppler radar 20, upon receiving through the network communicating module 17 the signal for controlling the parabola antenna 12 to perform the CAPPI scan, starts the CAPPI scan of the parabola antenna 12. The reception signal processing module 16 of the dual-polarization Doppler radar 20 transmits, to the meteorological information processing device 50 through the network communicating module 17 and the network 9c, the signals indicating, while the time point i=1 to N and the parabola antenna 12 is at the rotational angle αc(i) (0≤αc(i)<360) and the elevation angle βc(i) (βS≤βc(i)≤βL), the radar reflectivity factor Zch (αc(i), βc(i), dc(j)) of the horizontally polarized wave, the radar reflectivity factor Zcv (αc(i), βc(i), dc(j)) of the vertically polarized wave, and a radial velocity Vc (αc(i), βc(i), dc(j)) respectively at the distance dc(j) (j=1 to M, 0<dc(j)≤r1) from the parabola antenna 12.

The rain cloud detecting module 23 of the meteorological information processing device 50 receives from the single-polarization Doppler radar 1b through the network communicating module 21 the signal indicating the radar reflectivity factor Zb (αb(i), βb(i), db(j)) and the signal indicating the radial velocity Vb (αb(i), βb(i), db(j)). Note that, i=1 to N and j=1 to M. The rain cloud detecting module 23 calculates the rainfall intensity Rb (αb(i), βb(i), db(j)) based on the radar reflectivity factor Zb (αb(i), βb(i), db(j)).

Further, the rain cloud detecting module 23 receives from the dual-polarization Doppler radar 20 through the network communicating module 21 the signals indicating the radar reflectivity factor Zch (αc(i), βc(i), dc(j)) of the horizontally polarized wave, the radar reflectivity factor Zcv (αc(i), βc(i), dc(j)) of the vertically polarized wave, and the signal indicating the radial velocity Vc (αc(i), βc(i), dc(j)). Note that, i=1 to N and j=1 to M. The rain cloud detecting module 23 calculates the rainfall intensity Rc (αc(i), βc(i), dc(j)) based on the horizontal radar reflectivity factor Zch (αc(i), βc(i), dc(j)).

Moreover, since the single-polarization Doppler radar 1a also continues the CAPPI scan, the rain cloud detecting module 23 receives from the single-polarization Doppler radar 1a through the network communicating module 21 the signal indicating the radar reflectivity factor Za (αa(i), βa(i), da(j)) and the signal indicating the radial velocity Va (αa(i), βa(i), da(j)). Note that, i=1 to N and j=1 to M.

The rain cloud detecting module 23 predicts a future three-dimensional location of the rain cloud by using the three-dimensional velocity of the rain cloud obtained based on the radial velocities Va, Vb and Vc at the location where the rainfall intensity Ra indicates the given value or above at S203.

Since the processing after S205 is similar to that of the first embodiment, the description thereof is not repeated.

As described above, according to this embodiment, the single single-polarization Doppler radar is controlled to perform the scan to detect the location of the rain cloud, the two single-polarization Doppler radars and the dual-polarization Doppler radar are controlled to perform the scan to detect the three-dimensional velocity of the detected rain cloud and track the rain cloud. Further, the dual-polarization Doppler radar is controlled to perform the scan to detect the characteristics of the rain cloud. Therefore, the accurate location of the rain cloud can be detected and the characteristics of the rain cloud can be detected at low cost and in short time.

Third Embodiment

FIG. 13 is a view illustrating an arrangement of radars constituting a meteorological radar system of a third embodiment.

As illustrated in FIG. 13, this meteorological radar system includes three single-polarization Doppler radars 1a, 1b and 1c, a single dual-polarization Doppler radar 20, and a meteorological information processing device 50.

The single-polarization Doppler radars 1a, 1b and 1c and the dual-polarization Doppler radar 20 are disposed at different locations discretely. These radars 1a, 1b, 1c and 20 are small in size, and may be installed in a small area, such as at a rooftop of a building. These radars 1a, 1b, 1c and 20 are not arranged in line. Further, antennas of these radars 1a, 1b, 1c and 20 are single element antennas, respectively.

A detectable distance of each of single-polarization Doppler radars 1a, 1b and 1c and the dual-polarization Doppler radar 20 is r1 in radius. The single-polarization Doppler radars 1a, 1b and 1c are used to detect a location of the rain cloud. The dual-polarization Doppler radar 20 is used to detect characteristics of the detected rain cloud.

An area AR where the detectable areas of the single-polarization Doppler radar 1a, 1b and 1c, and the detectable area of the dual-polarization Doppler radar 20 overlap with each other is a detectable area for rain cloud.

The single-polarization Doppler radars 1a, 1b and 1c and the dual-polarization Doppler radar 20 are connected with the meteorological information processing device 50 through wired/wireless networks 9a, 9b, 9c and 9d, respectively.

FIG. 14 is a view illustrating a procedure of a detection of rain cloud and a characteristic detection of the rain cloud in the third embodiment.

At S301, a radar controlling module 22 of the meteorological information processing device 50 transmits a command signal for shifting the dual-polarization Doppler radar 20 to a low power consumption state, to the dual-polarization Doppler radar 20 through a network communicating module 21 and the network 9d. A power source controlling module 18 of the dual-polarization Doppler radar 20 shifts to the low power consumption state upon receiving through a network communicating module 17 the command signal for shifting to the low power consumption state.

At S302, the radar controlling module 22 of the meteorological information processing device 50 transmits a signal for controlling plane antennas 2 of the three single-polarization Doppler radars 1a, 1b and 1c to perform a CAPPI scan, to the single-polarization Doppler radars 1a, 1b and 1c through the network communicating module 21 and the networks 9a, 9b and 9c.

An antenna controlling module 3 of the single-polarization Doppler radar 1a, upon receiving through a network communicating module 7 the signal for controlling the plane antenna 2 to perform the CAPPI scan, starts the CAPPI scan of the plane antenna 2. A reception signal processing module 6 of the single-polarization Doppler radar 1a transmits, to the meteorological information processing device 50 through the network communicating module 7 and the network 9a, signals indicating, while a time point i=1 to N and the plane antenna 2 is at a rotational angle αa(i) (0≤αa(i)<360) and an elevation angle βa(i) (βS≤βa(i)≤βL), a radar reflectivity factor Za (αa(i), βa(i), da(j)) and a radial velocity Va (αa(i), βa(i), da(j)) respectively at a distance da(j) (j=1 to M, 0<da(j)≤r1) from the plane antenna 2.

Similarly, an antenna controlling module 3 of the single-polarization Doppler radar 1b, upon receiving through a network communicating module 7 the signal for controlling the plane antenna 2 to perform the CAPPI scan, starts the CAPPI scan of the plane antenna 2. A reception signal processing module 6 of the single-polarization Doppler radar 1b transmits, to the meteorological information processing device 50 through the network communicating module 7 and the network 9b, signals indicating, while the time point i=1 to N and the plane antenna 2 is at a rotational angle $\alpha b(i)$ ($0 \leq \alpha b(i) < 360$) and an elevation angle $\beta b(i)$ ($\beta S \leq \beta b(i) \leq \beta L$), a radar reflectivity factor Zb ($\alpha b(i)$, $\beta b(i)$, db(j)) and a radial velocity Vb ($\alpha b(i)$, $\beta b(i)$, db(j)) respectively at a distance db(j) (j=1 to M, $0 < db(j) \leq r1$) from the plane antenna 2.

Similarly, an antenna controlling module 3 of the single-polarization Doppler radar 1c, upon receiving through 1 network communicating module 7 the signal for controlling the plane antenna 2 to perform the CAPPI scan, starts the CAPPI scan of the plane antenna 2. A reception signal processing module 6 of the single-polarization Doppler radar 1c transmits, to the meteorological information processing device 50 through the network communicating module 7 and the network 9c, signals indicating, while the time point i=1 to N and the plane antenna 2 is at a rotational angle $\alpha c(i)$ ($0 \leq \alpha c(i) < 360$) and an elevation angle $\beta c(i)$ ($\beta S \leq \beta c(i) \leq \beta L$), a radar reflectivity factor Zc ($\alpha c(i)$, $\beta c(i)$, dc(j)) and a radial velocity Vc ($\alpha c(i)$, $\beta c(i)$, dc(j)) respectively at a distance dc(j) (j=1 to M, $0 < dc(j) \leq r1$) from the plane antenna 2.

A rain cloud detecting module 23 of the meteorological information processing device 50 receives from the single-polarization Doppler radar 1a through the network communicating module 21 the signal indicating the radar reflectivity factor Za ($\alpha a(i)$, $\beta a(i)$, da(j)) and the signal indicating the radial velocity Va ($\alpha a(i)$, $\beta a(i)$, da(j)), receives from the single-polarization Doppler radar 1b through the network communicating module 21 the signal indicating the radar reflectivity factor Zb ($\alpha b(i)$, $\beta b(i)$, db(j)) and the signal indicating the radial velocity Vb ($\alpha b(i)$, $\beta b(i)$, db(j)), and receives from the single-polarization Doppler radar 1c through the network communicating module 21 the signal indicating the radar reflectivity factor Zc ($\alpha c(i)$, $\beta c(i)$, dc(j)) and the signal indicating the radial velocity Vc ($\alpha c(i)$, $\beta c(i)$, dc(j)). Note that, i=1 to N and j=1 to M. The rain cloud detecting module 23 calculates a rainfall intensity Ra ($\alpha a(i)$, $\beta a(i)$, da(j)) based on the radar reflectivity factor Za ($\alpha a(i)$, $\beta a(i)$, da(j)), calculates a rainfall intensity Rb ($\alpha b(i)$, $\beta b(i)$, db(j)) based on the radar reflectivity factor Zb ($\alpha b(i)$, $\beta b(i)$, db(j)), and calculates a rainfall intensity Rc ($\alpha c(i)$, $\beta c(i)$, dc(j)) based on the radar reflectivity factor Zc ($\alpha c(i)$, $\beta c(i)$, dc(j)).

At S303, within i=1 to N and j=1 to M, at i and j included in the overlapping area AR illustrated in FIG. 13, the rain cloud detecting module 23 checks whether the rain cloud exists at a location inside the overlapping area AR illustrated in FIG. 13 and defined by ($\alpha a(i)$, $\beta a(i)$, da(j)) centering on the single-polarization Doppler radar 1a, by determining whether the rainfall intensity Ra ($\alpha a(i)$, $\beta a(i)$, da(j)) is a given value TH or above. Further, within i=1 to N and j=1 to M, at i and j included in the overlapping area AR illustrated in FIG. 13, the rain cloud detecting module 23 checks whether the rain cloud exists at a location inside the overlapping area AR illustrated in FIG. 13 and defined by ($\alpha b(i)$, $\beta b(i)$, db(j)) centering on the single-polarization Doppler radar 1b, by determining whether the rainfall intensity Rb ($\alpha b(i)$, $\beta b(i)$, db(j)) indicates the given value TH or above. Moreover, within i=1 to N and j=1 to M, at i and j included in the overlapping area AR illustrated in FIG. 13, the rain cloud detecting module 23 checks whether the rain cloud exists at a location inside the overlapping area AR illustrated in FIG. 13 and defined by ($\alpha c(i)$, $\beta c(i)$, dc(j)) centering on the single-polarization Doppler radar 1c, by determining whether the rainfall intensity Rc ($\alpha c(i)$, $\beta c(i)$, dc(j)) indicates the given value TH or above.

If the rain cloud is detected, in other words, if one of the rainfall intensities Ra ($\alpha a(i)$, $\beta a(i)$, da(j)), Rb ($\alpha b(i)$, $\beta b(i)$, db(j)), and Rc ($\alpha c(i)$, $\beta c(i)$, dc(j)) indicating the given value TH or above is detected (YES at S303), the processing proceeds to S304.

If the rain cloud is not detected, in other words, if neither one of the rainfall intensities Ra ($\alpha a(i)$, $\beta a(i)$, da(j)), Rb ($\alpha b(i)$, $\beta b(i)$, db(j)), and Rc ($\alpha c(i)$, $\beta c(i)$, dc(j)) indicating the given value TH or above is detected (NO at S303), the processing returns to S302.

When a rain cloud 510a is detected as illustrated in FIG. 10, at S304, the rain cloud detecting module 23 predicts a current three-dimensional location of the rain cloud by using a three-dimensional velocity of the rain cloud obtained based on the radial velocities Va, Vb and Vc at the location where one of the rainfall intensities Ra, Rb and Rc is detected to be the given value or above at S303. Moreover, the rain cloud detecting module 23 predicts a future three-dimensional location of the rain cloud by using the three-dimensional velocity of the rain cloud obtained based on the radial velocities Va, Vb and Vc at the predicted current location.

Next, the rain cloud detecting module 23, upon receiving the signal from one of the single-polarization Doppler radars 1a, 1b and 1c, determines whether the location where the one of the rainfall intensities Ra, Rb and Rc of the corresponding radar indicates the given value or above exists near the predicted location for after the rain cloud moves. By using the three-dimensional velocity, in addition to a horizontal movement of the rain cloud, a vertical movement can also be tracked as indicated by 510b of FIG. 10.

The rain cloud detecting module 23 repeats, for a given period of time, the tracking processing of the rain cloud as described above, in other words, the processing in which the three-dimensional velocity of the rain cloud is detected by controlling the three radars 1a, 1b and 1c to perform the CAPPI scan, the location of the rain cloud is predicted by using the three-dimensional velocity of the rain cloud, and whether the location where one of the rainfall intensities Ra, Rb and Rc indicates the given value or above exists near the predicted location is searched for.

If the state where the location where one of the rainfall intensities Ra, Rb and Rc indicates the given value or above exists, in other words, the state where the rain cloud remains, continues for the given time period (YES at S305), the processing proceeds to S306, and if the state where the rain cloud remains does not continue for the given time period (NO at S305), the processing returns to S301.

At S306, the radar controlling module 22 of the meteorological information processing device 50 transmits the command signal for shifting the dual-polarization Doppler radar 20 to a normal power consumption state, to the dual-polarization Doppler radar 20 through the network communicating module 21 and the network 9d. Upon receiving through the network communicating module 17 the command signal for shifting to the normal power consumption state, the power source controlling module 18 of the dual-polarization Doppler radar 20 shifts to the normal power consumption state.

At S307, the radar controlling module 22 of the meteorological information processing device 50 transmits a signal for controlling the antenna of the dual-polarization Doppler radar 20 to perform an RHI scan at a bearing angle $\alpha d1$, to the dual-polarization Doppler radar 20 through the network communicating module 21 and the network 9d. The bearing angle αdl is calculated based on the location of the rain cloud for after it moves, predicted by using the three-dimensional velocity obtained at S303.

The antenna controlling module 13 of the dual-polarization Doppler radar 20, upon receiving through the network communicating module 17 the signal for controlling the antenna to perform the RHI scan at the fixed bearing angle αdl, controls the parabola antenna 12 to perform the RHI scan. A reception signal processing module 16 of the dual-polarization Doppler radar 20 transmits to the meteorological information processing device 50 through the network communicating module 17 and the network 9d, signals indicating, while the time point i=1 to N and the parabola antenna 12 is at the fixed bearing angle αdl and an elevation angle βd(i) (βS≤βc(i)≤βL), a radar reflectivity factor Zdh (αdl, βd(i), dd(j)) of the horizontally polarized wave and a radar reflectivity factor Zdv (αdl, βd(i), dd(j)) of the vertically polarized wave respectively at a distance dd(j) (j=1 to M, 0<dd(j)≤r1) from the parabola antenna 12.

A rain cloud characteristic detecting module 26 of the meteorological information processing device 50 receives the signals indicating the radar reflectivity factor Zdh (αdl, βd(i), dd(j)) of the horizontally polarized wave and the radar reflectivity factor Zdv (αdl, dd(j)) of the vertically polarized wave, from the dual-polarization Doppler radar 20 through the network communicating module 21. Note that, i=1 to N and j=1 to M.

The rain cloud characteristic detecting module 26 detects the characteristics of the precipitation particle forming the rain cloud and the vertical length of the rain cloud at the location (αdl, βd(i), dd(j)) based on the radar reflectivity factor Zdh (αdl, βd(i), dd(j)) of the horizontally polarized wave and the radar reflectivity factor Zdv (αdl, βd(i), dd(j)) of the vertically polarized wave.

For example, the rain cloud characteristic detecting module 26 determines the characteristics of the precipitation particle at the location (αdl, βd(i), dd(j)) based on the radar reflectivity factor Zdh of the horizontally polarized wave, one of a difference and a ratio between the radar reflectivity factor Zdh of the horizontally polarized wave and the radar reflectivity factor Zdv of the vertically polarized wave, a correlation coefficient between the radar reflectivity factor Zdh of the horizontally polarized wave and the radar reflectivity factor Zdv of the vertically polarized wave, and a propagation phase difference change ratio that is a change ratio of a difference between a phase change of the radar reflectivity factor Zdh of the horizontally polarized wave and a phase change of the radar reflectivity factor Zdv of the vertically polarized wave with respect to distance. The rain cloud characteristic detecting module 26 determines, for example, the size and type of the precipitation particle as the characteristics of the precipitation particle. The rain cloud characteristic detecting module 26 determines whether the type of the precipitation particle is one of four types of rain, graupel, ice pellet, and snowflake.

Further, when the type of the precipitation particle at the location (αdl, βd(i), dd(j)) is one of graupel, ice pellet, and snowflake, the rain cloud characteristic detecting module 26 determines that the location is an ice phase.

Moreover, the rain cloud characteristic detecting module 26 calculates a rainfall intensity Rd (αdl, βd(i), dd(j)) based on the radar reflectivity factor Zdh (αdl, βd(i), dd(j)) of the horizontally polarized wave. The rain cloud characteristic detecting module 26 determines an area where the rainfall intensity Rd (αdl, βd(i), dd(j)) continuously indicates the given value or above, to be an existing range of the rain cloud in the vertical direction, and determines a length of the existing range in the vertical direction to be a length of the rain cloud in the vertical direction.

Since the processing after S307 is similar to that of the first embodiment, the description thereof is not repeated.

As described above, according to this embodiment, the three single-polarization Doppler radars are controlled to perform the scan to detect the location of the rain cloud, the three single-polarization Doppler radars are controlled to perform the scan to detect the three-dimensional velocity of the detected rain cloud and track the rain cloud. Further, the dual-polarization Doppler radar is controlled to perform the scan to detect the characteristics of the rain cloud. Therefore, the accurate location of the rain cloud can be detected and the characteristics of the rain cloud can be detected at low cost and in short time.

(Modifications)

This disclosure is not limited to the above embodiments, and also includes the following modifications, for example.

(1) Dual-polarization Doppler Radar in Third Embodiment

In the third embodiment, the dual-polarization radar is described as the Doppler radar; however, there is no limitation to this. The dual-polarization radar may be a radar without the function to detect the velocity.

(2) Detection of Rain Cloud

In the embodiments of this disclosure, the rain cloud is detected to exist when the rainfall intensity indicates the given value or above; however, there is no limitation to this. For example, the rain cloud may be detected to exist when an area of continuous locations where the rainfall intensity indicates the given value or above exists.

(3) Selecting Rain Cloud

In the embodiments of this disclosure, when a plurality of rain clouds are detected, a rain cloud of which rainfall intensity indicates a highest value among the plurality of rain clouds may be selected to be the rain cloud to be tracked and of which characteristics are to be detected.

Alternatively, by taking into consideration a characteristic that a rain cloud of which precipitation particle has a largest size (i.e., the ratio between the radar reflectivity factors of the horizontally and vertically polarized waves obtained by the dual-polarization Doppler radar is the largest) among the plurality of rain clouds easily causes precipitation, when the plurality of rain clouds are detected, the rain cloud detecting module detects, based on the signals from the dual-polarization Doppler radar, sizes of the precipitation particles forming the detected rain clouds, and selects, based on the detected sizes, a rain cloud with a highest possibility of causing precipitation to be the rain cloud to be tracked and of which characteristics are to be detected.

(4) Determination of Characteristics of Precipitation Particle

In the embodiments of this disclosure, the characteristics of the precipitation particle are determined by using the radar reflectivity factor of the horizontally polarized wave, the radar reflectivity factor of the vertically polarized wave, one of the difference and the ratio between the radar reflectivity factors of the horizontally and vertically polarized waves, the correlation coefficient between the radar reflectivity factors of the horizontally and vertically polarized waves, and the propagation phase difference change ratio; however, there is no limitation to this. The characteristics of the precipitation particle may be determined by using one or some of the above amounts of characteristics or other amounts of characteristics.

Further in the embodiments of this disclosure, the dual-polarization radar is used to determine the characteristics of the precipitation particle; however, there is no limitation to this. For example, the characteristics of the precipitation particle may be determined by using a circular polarization radar. Moreover in this embodiment, the size and type of the precipitation particle are determined as the characteristics of the precipitation particle; however, there is no limitation to this. For example, the shape of the precipitation particle may also be determined.

(5) Prediction of Precipitation

In the embodiments of this disclosure, when precipitation is predicted to occur, the type, time point, and location of the precipitation are further predicted; however, there is no limitation to this. Alternatively, one or some of the above elements may be predicted, or a precipitation amount may also be predicted. The precipitation amount can be predicted based on, for example, the rainfall intensity.

(6) Determination Result and Prediction Result

The location of the rain cloud and the characteristics of the precipitation particle which are determined in the embodiments of this disclosure, and whether the precipitation occurs and the type, time point, location, and amount of the precipitation which are predicted in the embodiments of this disclosure may be displayed on a display unit connected with the meteorological information processing device and placed at a location where an observer can visually observe. Moreover, the prediction result may be transmitted to a disaster prevention system, to predict a flood, a landslide, etc.

(7) Dual-Polarization Doppler Radar

In the first embodiment of this disclosure, a single dual-polarization Doppler radar and two single-polarization Doppler radars are provided; however, there is no limitation to this. Three dual-polarization Doppler radars may be provided alternatively.

(8) Location of Meteorological Information Processing Device

In the embodiments of this disclosure, the meteorological information processing device is connected with one of the single-polarization Doppler radar and the dual-polarization Doppler radar through the networks; however, there is no limitation to this. The meteorological information processing device may be integrated with one of the single-polarization Doppler radar and the dual-polarization Doppler radar.

(9) Reception Signal Processing Module

In the embodiments of this disclosure, in the reception signal processing performed within each radar, the radar reflectivity factor and the radial velocity are generated based on the reception signal; however, there is no limitation to this. For example, the radar reflectivity factor and the radial velocity may be calculated based on the reception signal on the meteorological information processing device side.

(10) Using Three-Dimensional Velocity

The three-dimensional velocity obtained in the embodiments of this disclosure may be used to predict the precipitation as follows, for example. When directions of three-dimensional velocities match in a plurality of adjacent areas, a rain cloud formed over the plurality of areas has a high possibility of further growing in the future, and when the directions of three-dimensional velocities are different in the plurality of adjacent areas, the rain cloud formed over the plurality of areas has a high possibility of dissolving in the future.

(11) Control of Radar in Detecting Rain Cloud

In the first embodiment of this disclosure, when searching for the rain cloud, the dual-polarization Doppler radar is set into the low power consumption state and the antennas of the two single-polarization Doppler radars are controlled to perform the CAPPI scan; however, there is no limitation to this. The rain cloud may be searched by controlling the antennas of the single dual-polarization Doppler radar and the two single-polarization Doppler radars to perform the CAPPI scan.

The embodiments disclosed here are illustrations in all aspects, and therefore, it must not be interpreted in a limited way. The scope of this disclosure is defined by the following claims and not by the above description, and intended to include all of modifications within an equivalent extent of the claims and within the scope of the claims.

DESCRIPTION OF REFERENCE NUMERAL(S)

1a, 1b, 1c Single-polarization Doppler Radar
2 Plane Antenna
3, 13 Antenna Controlling Module
4, 14 Transmission/reception Switch
5, 15 Transmitting Module
6, 16 Reception Signal Processing Module
8, 18 Power Source Controlling Module
9a, 9b, 9c, 9d Network
12 Parabola Antenna
20 Dual-polarization Doppler Radar
50 Meteorological Information Processing Device
7, 17, 21 Network Communicating Module
22 Radar Controlling Module
23 Rain Cloud Detecting Module
26 Rain Cloud Characteristic Detecting Module
27 Precipitation Predicting Module
510a, 510b, 510c Rain Cloud

The invention claimed is:

1. A meteorological information processing device, comprising:
processing circuitry configured to:
detect a location and three-dimensional velocity of a rain cloud in an overlapping area of each detectable area detected by at least three radars including a first and second radar that each include a single-polarization radar and at least a third radar that includes a dual-polarization radar based on signals transmitted to the overlapping area from the first, the second and the third radars positioned at different locations respectively; and
detect a characteristic of the rain cloud based on signals from the dual-polarization radar.

2. The meteorological information processing device of claim 1, wherein the processing circuitry tracks the rain cloud by using the detected three-dimensional velocity of the rain cloud.

3. The meteorological information processing device of claim 2, wherein when a plurality of rain clouds are detected, the processing circuitry detects, based on the signals from one of the at least three radars, sizes of precipitation particles forming the rain clouds, respectively, and selects, based on the detected sizes, a rain cloud with a highest possibility of causing precipitation as the rain cloud to be tracked.

4. The meteorological information processing device of claim 1, wherein the processing circuitry detects the characteristic of the rain cloud based on the signals from the third radar,
wherein the first and second radars are single-polarization radars, and
wherein the third radar is the dual-polarization radar.

5. The meteorological information processing device of claim 1, wherein the processing circuitry detects the characteristic of the rain cloud based on signals from a fourth radar different from the at least three radars, and
wherein the fourth radar is the dual-polarization radar.

6. The meteorological information processing device of claim 1, wherein the processing circuitry detects the location and three-dimensional velocity of the rain cloud based on signals obtained by controlling antennas of the at least three radars to perform a scan in a CAPPI mode.

7. The meteorological information processing device of claim 1, wherein the processing circuitry detects the characteristic of the rain cloud based on signals obtained by controlling an antenna of the radar to perform an RHI scan, the radar used to obtain the signals for detecting the characteristic of the rain cloud.

8. The meteorological information processing device of claim 1, wherein the processing circuitry detects the three-dimensional velocity of the rain cloud by detecting the location of the rain cloud, controlling antennas of the first to third radars to perform a scan, and synthesizing velocity components obtained for the detected location of the rain cloud by the respective first to third radars, the location of the rain cloud detected based on signals obtained by controlling antennas of the first and second radars to perform the scan.

9. The meteorological information processing device of claim 8, the processing circuitry further configured to operate the third radar in a low power consumption state until the rain cloud is detected based on the signals from the first and second radars.

10. The meteorological information processing device of claim 1, wherein the processing circuitry detects the three-dimensional velocity of the rain cloud by detecting the location of the rain cloud and a two-dimensional velocity of the rain cloud, predicting, based on the detected two-dimensional velocity of the rain cloud, a location of the rain cloud after the rain cloud moves, controlling the antennas of the first to third radars to perform a scan, and synthesizing velocity components obtained for the predicted location of the rain cloud by the respective first to third radars, the location of the rain cloud and the two-dimensional velocity of the rain cloud detected based on signals obtained by controlling the antennas of the first and second radars to perform the scan.

11. The meteorological information processing device of claim 1, wherein the processing circuitry detects the three-dimensional velocity of the rain cloud by detecting the location of the rain cloud based on the signal obtained by controlling an antenna of the first radar to perform a scan, controlling antennas of the first to third radars to perform the scan, and synthesizing velocity components obtained for the detected location of the rain cloud by the respective first to third radars.

12. The meteorological information processing device of claim 11, the processing circuitry further configured to operate each of the second and third radars in a low power consumption state until the rain cloud is detected based on the signal from the first radar.

13. The meteorological information processing device of claim 1, wherein the processing circuitry detects the characteristic of a precipitation particle forming the rain cloud.

14. The meteorological information processing device of claim 1, wherein the processing circuitry detects a vertical length of the rain cloud.

15. The meteorological information processing device of claim 1, the processing circuitry further configured to predict precipitation based on at least one of the detected location, three-dimensional velocity and characteristic of the rain cloud.

16. The meteorological information processing device of claim 15, wherein the characteristic of the rain cloud includes a size of a precipitation particle forming the rain cloud, and
wherein the processing circuitry predicts occurrence of the precipitation based on the size of the precipitation particle forming the rain cloud.

17. The meteorological information processing device of claim 15, wherein the processing circuitry predicts occurrence of the precipitation based on a vertical length of the rain cloud.

18. A meteorological radar system, comprising:
two single-polarization radars and a single dual-polarization radar that are positioned at different locations; and
a meteorological information processing device including:
processing circuitry configured to:
detect a location and three-dimensional velocity of a rain cloud in an overlapping area of each detectable area detected by the two single-polarization radars and the single dual-polarization radar, based on signals transmitted to the overlapping area from the two single-polarization radars and the single dual-polarization radar; and
detect a characteristic of the rain cloud based on signals from the dual-polarization radar.

19. The meteorological radar system of claim 18, wherein in a transmission and reception of a radio wave, each of the three radars forms a pencil type antenna beam.

20. A method of processing meteorological information, comprising:
detecting a location of a rain cloud in an overlapping area of each detectable area detected by at least three radars including a first and second radar that each include a single-polarization radar and at least a third radar that includes a dual-polarization radar based on a signal obtained by controlling at least one of antennas of the three radars to perform a CAPPI scan, the first, the second, and the third radars positioned at different locations respectively;
detecting a three-dimensional velocity of the rain cloud in the overlapping area based on signals obtained by controlling the antennas of the three radars to perform the CAPPI scan;
tracking the rain cloud by using the detected three-dimensional velocity of the rain cloud; and
detecting a characteristic of the rain cloud based on signals obtained by controlling an antenna of the dual-polarization radar to perform an RHI scan.

* * * * *